(12) United States Patent (10) Patent No.: US 10,181,296 B2
Ueki et al. (45) Date of Patent: Jan. 15, 2019

(54) DISPLAY DEVICE AND DISPLAY METHOD

(71) Applicant: Panasonic Intellectual Property Management Co., Ltd., Osaka (JP)

(72) Inventors: Akihiro Ueki, Kanagawa (JP); Toshiyuki Maeda, Kanagawa (JP); Akira Shiokawa, Osaka (JP); Koji Aoto, Hyogo (JP); Koji Nakanishi, Kanagawa (JP); Hideki Aoyama, Osaka (JP); Kengo Miyoshi, Kanagawa (JP); Mitsuaki Oshima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 15/352,640

(22) Filed: Nov. 16, 2016

(65) Prior Publication Data

US 2017/0061900 A1 Mar. 2, 2017

Related U.S. Application Data

(63) Continuation of application No. PCT/JP2015/004188, filed on Aug. 21, 2015.

(30) Foreign Application Priority Data

Sep. 26, 2014 (JP) .................... 2014-196568

(51) Int. Cl.
*G09G 3/34* (2006.01)
*G09G 3/20* (2006.01)
(Continued)

(52) U.S. Cl.
CPC ............ *G09G 3/3406* (2013.01); *G09G 3/20* (2013.01); *G09G 3/34* (2013.01); *G09G 3/36* (2013.01);
(Continued)

(58) Field of Classification Search
CPC ......... G09G 2370/022; G09G 2370/16; G09G 2370/18; G09G 3/20; G09G 3/34;
(Continued)

(56) References Cited

U.S. PATENT DOCUMENTS 6,278,537 B1    8/2001  Miyamori
7,213,254 B2 *  5/2007  Koplar ............. G06K 19/07703
                                            348/E7.071

(Continued)

FOREIGN PATENT DOCUMENTS

JP    2007-028682    2/2007
JP    2007-043706    2/2007
(Continued)

OTHER PUBLICATIONS

International Search Report of PCT application No. PCT/JP2015/004188 dated Nov. 10, 2015.

*Primary Examiner* — Tony Davis
(74) *Attorney, Agent, or Firm* — Wenderoth, Lind & Ponack, L.L.P.

(57) ABSTRACT

A display device of the present disclosure is a display device capable of outputting, by a Carousel method, a visible light communication signal including a plurality of signal units. The display device includes a display panel that displays a video signal, a visible light communication processor that encodes the signal units, divides the encoded signal units into a plurality of blocks, generates a plurality of transmission frames by using the plurality of blocks, and uses the generated transmission frames as a backlight control signal, and a backlight that illuminates the display panel from the back surface of the display panel based on the backlight control signal. With regard to the plurality of transmission frames corresponding to one of the signal units generated by the visible light communication processor, an order of the plurality of blocks is different between at least two of the transmission frames.

7 Claims, 19 Drawing Sheets

(51) Int. Cl.
*G09G 3/36* (2006.01)
*H04B 10/116* (2013.01)
*H04N 5/38* (2006.01)
*H04N 5/66* (2006.01)
*H04N 7/18* (2006.01)

(52) U.S. Cl.
CPC ............. *H04B 10/116* (2013.01); *H04N 5/38* (2013.01); *G09G 2370/022* (2013.01); *G09G 2370/16* (2013.01); *G09G 2370/18* (2013.01); *H04N 5/66* (2013.01); *H04N 7/183* (2013.01)

(58) Field of Classification Search
CPC ...... G09G 3/3406; G09G 3/36; H04B 10/116; H04N 5/38; H04N 5/66; H04N 7/183
USPC .............................................. 345/4, 207, 690
See application file for complete search history.

(56) References Cited

U.S. PATENT DOCUMENTS

| | | | | |
|---|---|---|---|---|
| 8,179,933 | B1* | 5/2012 | Gregorski | H01S 5/0014 356/229 |
| 8,502,926 | B2* | 8/2013 | Bilbrey | H04N 5/74 348/744 |
| 8,749,471 | B2* | 6/2014 | Jang | G09G 3/3406 345/102 |
| 8,879,917 | B2* | 11/2014 | Deguchi | H04N 5/40 398/118 |
| 9,262,994 | B2* | 2/2016 | Mizoguchi | G09G 5/10 |
| 9,608,726 | B2* | 3/2017 | Ueki | H04B 10/116 |
| 9,608,727 | B2* | 3/2017 | Aoyama | |
| 9,871,587 | B2* | 1/2018 | Aoyama | H04N 21/436 |
| 2004/0117856 | A1* | 6/2004 | Barsoum | G06Q 30/0207 725/138 |
| 2007/0024571 | A1 | 2/2007 | Maniam et al. | |
| 2009/0002265 | A1* | 1/2009 | Kitaoka | G09G 3/003 345/4 |
| 2009/0052902 | A1* | 2/2009 | Shinokura | H04B 10/1143 398/118 |
| 2010/0302268 | A1* | 12/2010 | Jun | G09G 3/3406 345/589 |
| 2011/0018911 | A1 | 1/2011 | Kitaoka et al. | |
| 2011/0037790 | A1* | 2/2011 | Onishi | G09G 3/342 345/690 |
| 2011/0216049 | A1* | 9/2011 | Jun | G09G 3/36 345/207 |
| 2012/0328302 | A1 | 12/2012 | Iizuka et al. | |
| 2013/0208027 | A1* | 8/2013 | Bae | G09G 3/3426 345/690 |
| 2013/0330088 | A1* | 12/2013 | Oshima | H04B 10/11 398/130 |
| 2014/0010549 | A1* | 1/2014 | Kang | H04B 10/116 398/118 |
| 2014/0023378 | A1* | 1/2014 | Bae | G06Q 30/02 398/128 |
| 2014/0184883 | A1* | 7/2014 | Shimamoto | G03B 3/00 348/345 |
| 2014/0184914 | A1 | 7/2014 | Oshima et al. | |
| 2014/0185860 | A1 | 7/2014 | Oshima et al. | |
| 2014/0186026 | A1* | 7/2014 | Oshima | H04B 10/116 398/25 |
| 2014/0186047 | A1* | 7/2014 | Oshima | H04B 10/11 398/118 |
| 2014/0186049 | A1* | 7/2014 | Oshima | H04B 10/1143 398/118 |
| 2014/0186050 | A1* | 7/2014 | Oshima | H04B 10/1143 398/118 |
| 2014/0186052 | A1* | 7/2014 | Oshima | H04B 10/1143 398/130 |
| 2014/0205136 | A1* | 7/2014 | Oshima | G09G 3/20 382/100 |
| 2014/0286644 | A1* | 9/2014 | Oshima | H04B 10/11 398/118 |
| 2014/0321859 | A1* | 10/2014 | Guo | H04B 10/116 398/118 |
| 2015/0030335 | A1* | 1/2015 | Son | H04B 10/116 398/118 |
| 2015/0071439 | A1* | 3/2015 | Liu | H04K 1/02 380/256 |
| 2016/0191158 | A1* | 6/2016 | Aoyama | H04B 10/1149 398/172 |
| 2016/0191159 | A1* | 6/2016 | Aoyama | H04B 10/116 398/172 |
| 2017/0061900 | A1* | 3/2017 | Ueki | G09G 3/20 |
| 2017/0149500 | A1* | 5/2017 | Aoyama | H04B 10/116 |
| 2017/0237488 | A1* | 8/2017 | Aoyama | H04B 10/116 398/118 |
| 2017/0264364 | A1* | 9/2017 | Aoyama | H04B 10/116 |
| 2017/0310743 | A1* | 10/2017 | Aoyama | H04L 67/1006 |

FOREIGN PATENT DOCUMENTS

| | | |
|---|---|---|
| JP | 2007-074268 | 3/2007 |
| JP | 2009-212768 | 9/2009 |
| JP | 2013-255253 | 12/2013 |
| WO | 2006/011515 | 2/2006 |
| WO | 2010/128629 | 11/2010 |
| WO | 2014/103157 | 7/2014 |
| WO | 2014/103333 | 7/2014 |
| WO | 2015/075937 | 5/2015 |

* cited by examiner

200

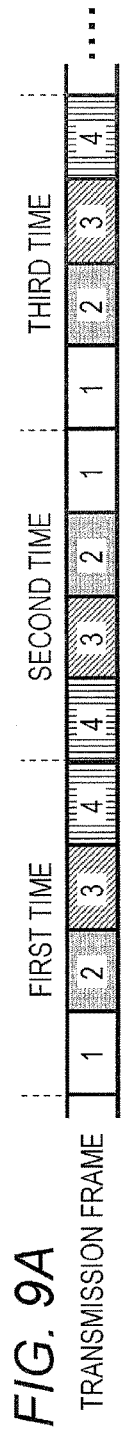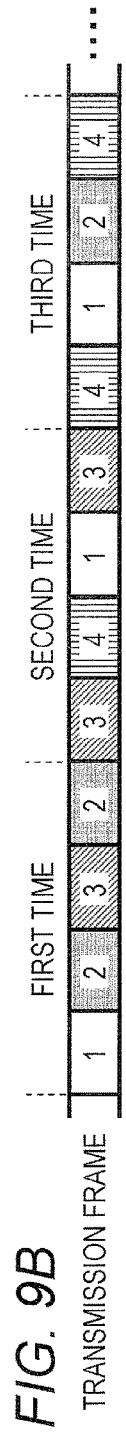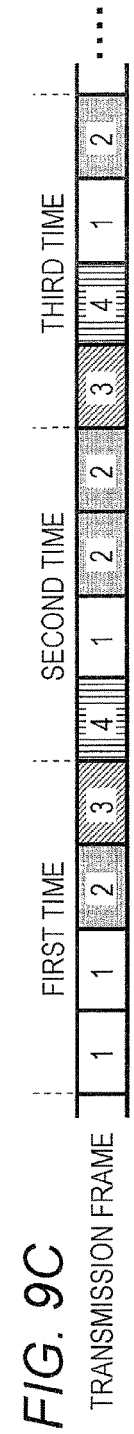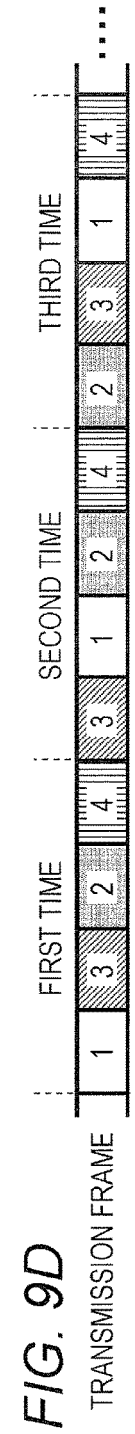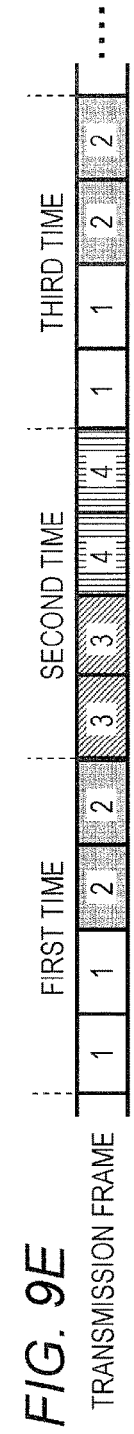

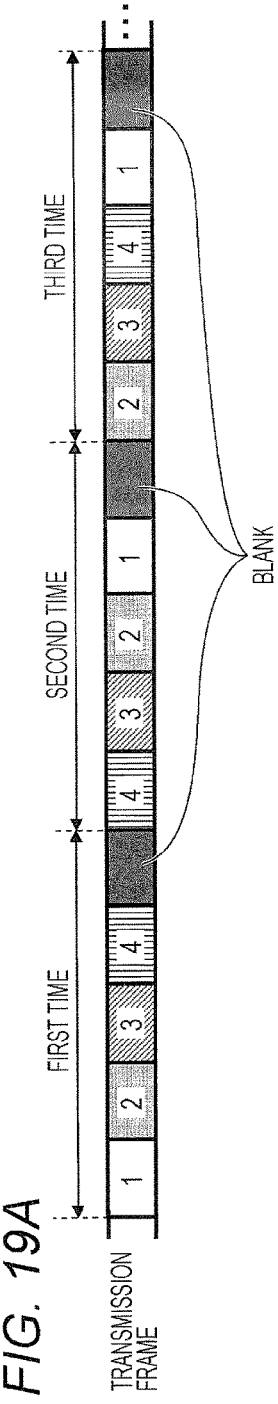
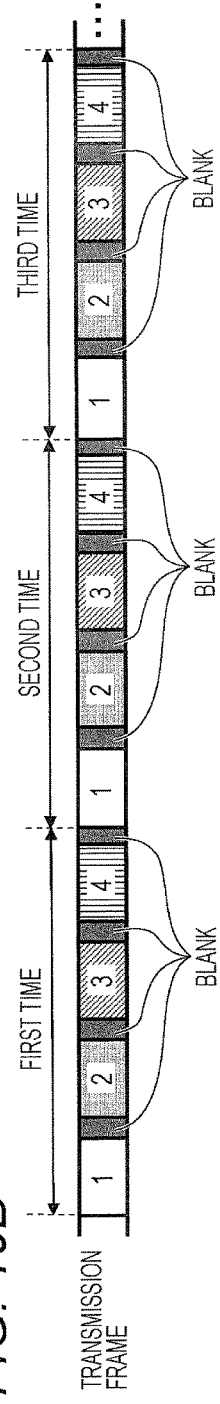
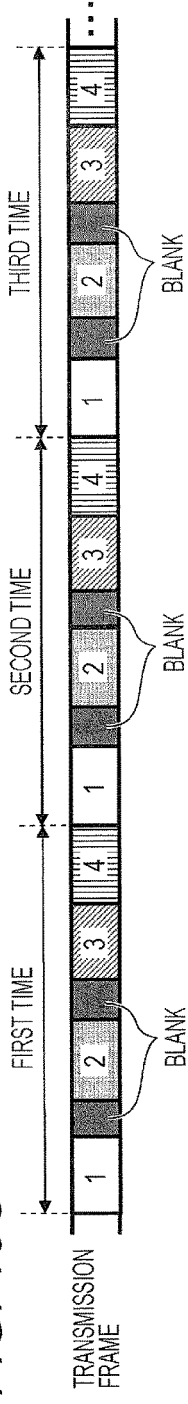

DISPLAY DEVICE AND DISPLAY METHOD

BACKGROUND

1. Technical Field

The present disclosure relates to a display device and a display method, which are capable of outputting a visible light communication signal.

2. Description of the Related Art

A visible light communication technology using a backlight of a display is disclosed. Unexamined Japanese Patent Publication No. 2007-43706 and Unexamined Japanese Patent Publication No. 2009-212768 disclose a display device that superimposes communication information, which is formed of visible light, on a video signal, and displays the superimposed communication information.

SUMMARY

The present disclosure provides a display device that outputs a visible light communication signal decodable by a receiver.

A display device in the present disclosure is a display device capable of outputting, by the Carousel method, the visible light communication signal including a plurality of signal units. The display device includes a display panel that displays a video signal, a visible light communication processor that encodes the signal units, divides the encoded signal units into a plurality of blocks, generates a plurality of transmission frames by using the plurality of blocks, and uses the generated transmission frames as a backlight control signal; and a backlight that illuminates the display panel from a back surface of the display panel based on the backlight control signal. With regard to the plurality of transmission frames corresponding to one of the signal units generated by the visible light communication processor, an order of the plurality of blocks is different between at least two of the transmission frames.

The display device of the present disclosure can output the visible light communication signal decodable by the receiver.

BRIEF DESCRIPTION OF THE DRAWINGS

FIG. 9A is a diagram illustrating a second generation example of the transmission frame corresponding to one signal unit according to the first exemplary embodiment;

FIG. 9B is a diagram illustrating a third generation example of the transmission frame corresponding to one signal unit according to the first exemplary embodiment;

FIG. 9C is a diagram illustrating a fourth generation example of the transmission frame corresponding to one signal unit according to the first exemplary embodiment;

FIG. 9D is a diagram illustrating a fifth generation example of the transmission frame corresponding to one signal unit according to the first exemplary embodiment;

FIG. 9E is a diagram illustrating a sixth generation example of the transmission frame corresponding to one signal unit according to the first exemplary embodiment;

FIG. 19A is a diagram illustrating a second generation example of the transmission frame corresponding to one signal unit according to the fourth exemplary embodiment;

FIG. 19B is a diagram illustrating a third generation example of the transmission frame corresponding to one signal unit according to the fourth exemplary embodiment;

FIG. 19C is a diagram illustrating a fourth generation example of the transmission frame corresponding to one signal unit according to the fourth exemplary embodiment.

DETAILED DESCRIPTION

A description will be given in detail below of exemplary embodiments with reference to the drawings as appropriate. However, a description more in detail than necessary is omitted in some case. For example, a detailed description of a well-known item and a duplicate description of substantially the same configuration are omitted in some case. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject matter described in the scope of claims.

First Exemplary Embodiment

A description will be given below of a first exemplary embodiment with reference to FIG. 1 to FIG. 9E.

[1-1. Configuration of Visible Light Communication System]

Figure 1:
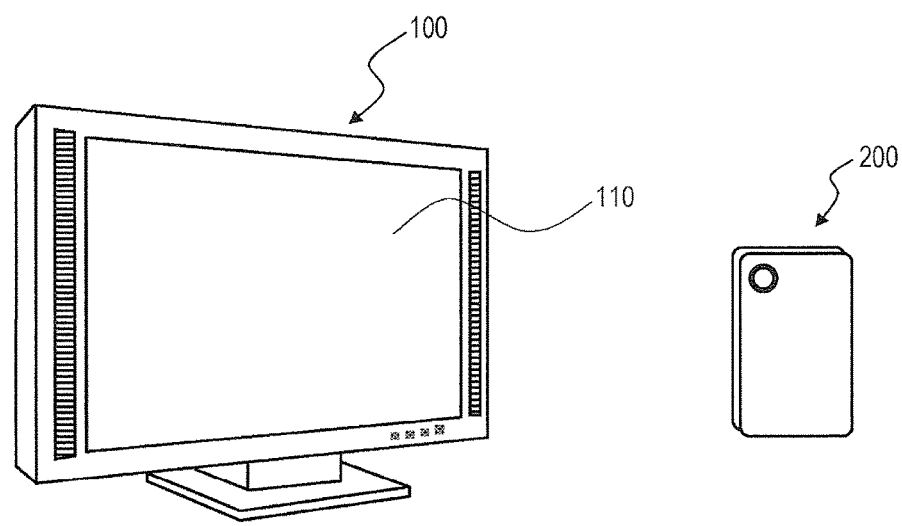
FIG. 1 is a schematic view of a visible light communication system according to a first exemplary embodiment.

FIG. 1 is a schematic view of a visible light communication system according to the first exemplary embodiment. In FIG. 1, visible light communication system 10 includes display device 100 and receiver 200.

For example, display device 100 is a display, and displays a video on display surface 110. Moreover, on the video displayed on display surface 110, a visible light communication signal is inserted or superimposed as information related to the displayed video.

Receiver 200 receives the visible light communication signal, which is output by being displayed on display surface 110 of display device 100, by imaging the video displayed on display surface 110. For example, receiver 200 is configured as a smart phone in which a rolling shutter-type image sensor is built. In such a way, a user of receiver 200 can receive information related to the video displayed on display device 100, and the like.

Note that, in this exemplary embodiment, the display is taken as an example of display device 100; however, display device 100 is not limited to this. Display device 100 may be a projection-type display device such as a projector.

Moreover, the smart phone is taken as an example of receiver 200; however, the receiver 200 just needs to be an electronic device capable of receiving the visible light communication signal. For example, the electronic device may be a receiver pursuant to "JEITA-CP1222 Visible Light ID System" prescribed by Japan Electronics and Information Technology Industries Association (JEITA). Moreover, the electronic device may be a general communication terminal.

Moreover, "capable of receiving visible light communication signal" refers to a capability of receiving the visible light communication signal and obtaining information by decoding the received visible light communication signal.

Moreover, a communication scheme of the visible light communication signal may be, for example, a communication scheme pursuant to "JEITA-CP1223 Visible Light Beacon System" prescribed by JEITA, a communication scheme pursuant to IEEE-P802.15 that is a standard of a Wireless Personal Area Network (WPAN) standardized by The Institute of Electrical and Electronics Engineers, Inc. (IEEE), or the like.

In other words, receiver 200 just needs to be an electronic device, which is communicable by the communication schemes and is further capable of receiving the visible light communication signal.

[1-2. Configuration of Display Device]

Figure 2:
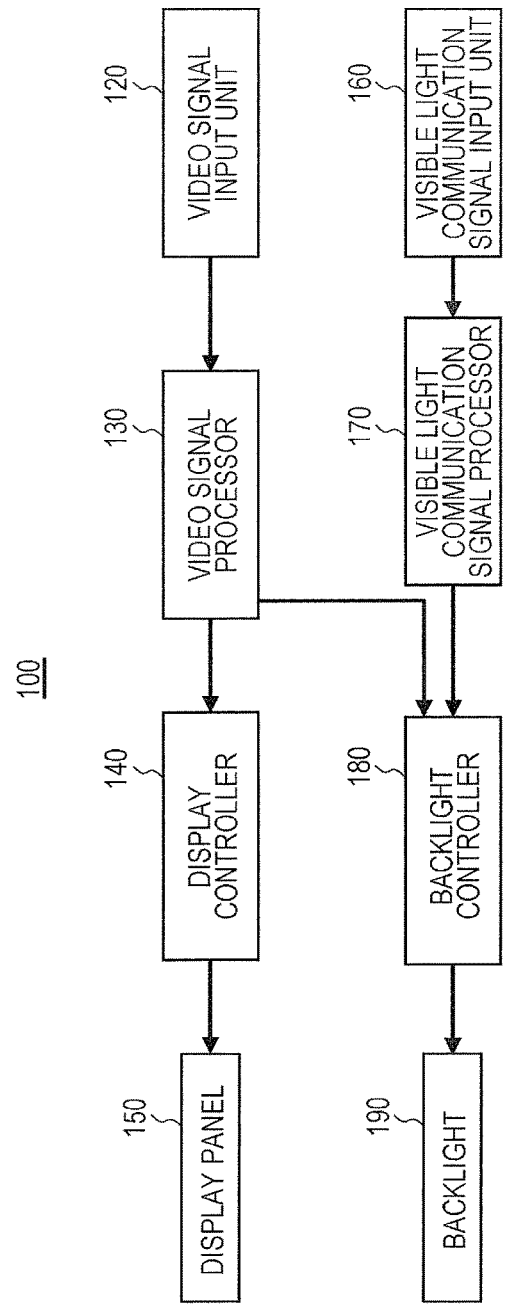
FIG. 2 is a block diagram of a display device according to the first exemplary embodiment.

FIG. 2 is a block diagram of the display device according to the first exemplary embodiment. In FIG. 2 display device 100 includes video signal input unit 120, video signal processor 130, display controller 140, display panel 150, visible light communication signal input unit 160, visible light communication signal processor 170, backlight controller 180, and backlight 190.

Video signal input unit 120 receives an input of the video signal, which is related to the video displayed on display panel 150, through an antenna cable, a composite cable, a High-Definition Multimedia Interface (HDMI: registered trademark) cable, PJ Link cable, a Local Area Network (LAN) cable, or the like. Video signal input unit 120 outputs the video signal, which is thus input thereto, to video signal processor 130.

Note that a video signal stored in a recording medium may be used as the video signal.

Video signal processor 130 implements general image processing such as decoding processing for the input video signal. Video signal processor 130 transmits the video signal, which is thus subjected to the image processing, to display controller 140 and backlight controller 180. The video signal includes information regarding lightness and the like of the video.

Based on the input video signal, display controller 140 controls display panel 150 to display the video on display surface 110 of display panel 150. More specifically, based on the video signal input from video signal processor 130, display controller 140 performs aperture control for liquid crystal of display panel 150, and so on.

For example, display panel 150 is a liquid crystal panel, and includes display surface 110 that displays a video.

Visible light communication signal input unit 160 receives the input of the visible light communication signal through a visible light communication signal cable, a LAN cable or the like.

Note that a visible light communication signal stored in the recording medium may be used as the visible light communication signal. Moreover, the visible light communication signal may be superimposed on the video signal.

Visible light communication signal input unit 160 outputs the input visible light communication signal to visible light communication signal processor 170.

Visible light communication signal processor 170 performs processing for encoding the input visible light communication signal by a predetermined encoding method, and further deciding a transmission order of the visible light communication signal, and the like. Visible light communication signal processor 170 converts the encoded visible light communication signal into a backlight controlling signal. Visible light communication signal processor 170 outputs the generated backlight controlling signal to backlight controller 180.

Backlight controller 180 divides a light emitting surface of backlight 190 into a plurality of regions, performs control for light emission in each of the plurality of regions, and performs control to provide a turn-off period at different timing in each of the plurality of regions on the light emitting surface.

Backlight controller 180 controls brightness and timing of backlight 190 based on information regarding lightness and the like of the video included in the input video signal. Moreover, backlight controller 180 controls light emission of backlight 190 based on the input backlight controlling signal.

Backlight 190 is installed on a back surface of display panel 150, and includes the light emitting surface that illuminates display surface 110 of display panel 150 from the back surface of display panel 150. Backlight 190 illuminates display panel 150 from the back surface of display panel 150. A viewer can visually recognize the video displayed on display panel 150.

In this exemplary embodiment, a whole of display surface 110 is used as a visible light communication region.

Figure 3:
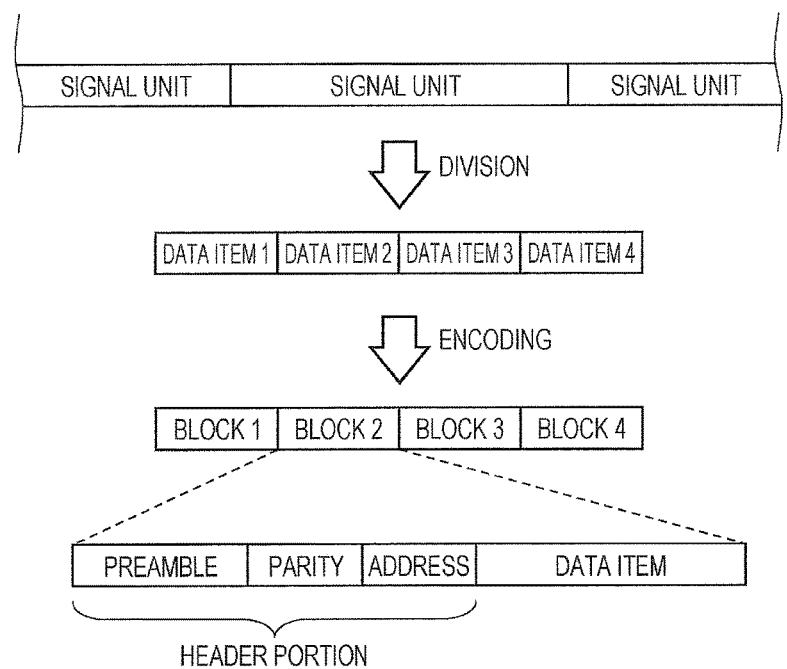
FIG. 3 is a diagram illustrating a generation example of a visible light communication signal according to the first exemplary embodiment.

FIG. 3 is a diagram illustrating a generation example of the visible light communication signal. As shown in FIG. 3, the visible light communication signal input to visible light communication signal input unit 160 includes a plurality of signal units with a predetermined length. Visible light communication signal processor 170 divides each of the signal units into a predetermined number of data items. In FIG. 3, one signal unit includes four data items with a same data length. That is, one signal unit is divided into data item 1, data item 2, data item 3, and data item 4. The division of one signal unit just needs to be decided based on a carrier frequency of the visible light communication signal output from display device 100, based on a data length of the signal unit of the visible light communication signal, and further, based on a period while backlight 190 does not emit light.

Note that, in FIG. 3, the description has been given on the premise that such data lengths of the data items obtained by dividing one signal unit are the same; however, the data lengths of the data items obtained by dividing one signal unit may be different from one another, or the data length of one data item among the data items obtained by dividing one signal unit may be different from the data lengths of the rest of the data items.

Next, visible light communication signal processor 170 encodes the divided data items, adds header portions to the respective data items, decides a transmission order, and generates a block. Specifically, visible light communication signal processor 170 generates block 1, block 2, block 3 and block 4 from data item 1, data item 2, data item 3, and data item 4. Visible light communication signal processor 170 transmits the generated blocks as backlight controlling signals to backlight controller 180 in order of block 1, block 2, block 3, and block 4.

Each of the header portions of the blocks includes a "preamble", an "address", and "parity". The preamble is a pattern indicating a start of the block, and includes an identifier indicating that the data item is the visible light communication signal. For example, as the preamble, there is used a signal that goes out of an encoding rule such as 4 Pulse Position Modulation (4PPM) or Inverted 4PPM (i-4PPM). The parity is used in order to detect an error of the data item. The address indicates a transmission order of the blocks in the signal unit.

Four blocks generated from one signal unit are called a transmission frame.

[1-3. Configuration of Receiver]

Figure 4:
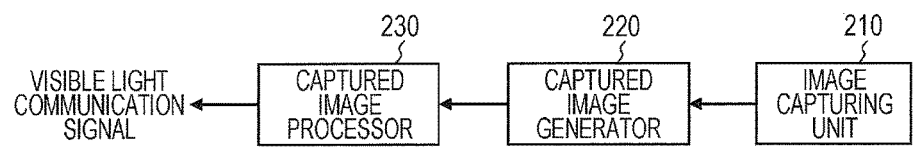
FIG. 4 is a block diagram of a receiver according to the first exemplary embodiment.

FIG. 4 is a block diagram of the receiver according to the first exemplary embodiment. In FIG. 4, receiver 200 includes image capturing unit 210, captured image generator 220, and captured image processor 230.

Image capturing unit 210 captures the video displayed on the visible light communication region of display device 100. For example, image capturing unit 210 is the rolling shutter-type image sensor. Upon starting the capturing of an image, the image sensor exposes the video using a rolling shutter, and sends exposure data items to captured image generator 220.

Captured image generator 220 temporarily stores the exposure data items, which are sent from image capturing unit 210, in a built-in memory. Captured image generator 220 generates the captured image based on the exposure data items stored in the memory.

Captured image processor 230 decodes the visible light communication signal from the captured image generated by captured image generator 220.

[1-4. Output and Reception of Visible Light Communication Signal]

Next, a description will be given of basic operations of receiving the transmission frame, which is output from the visible light communication region of display device 100, in receiver 200.

[1-4-1. Captured Image Corresponding to Turn-on/Turn-Off of Backlight]

Figure 5:
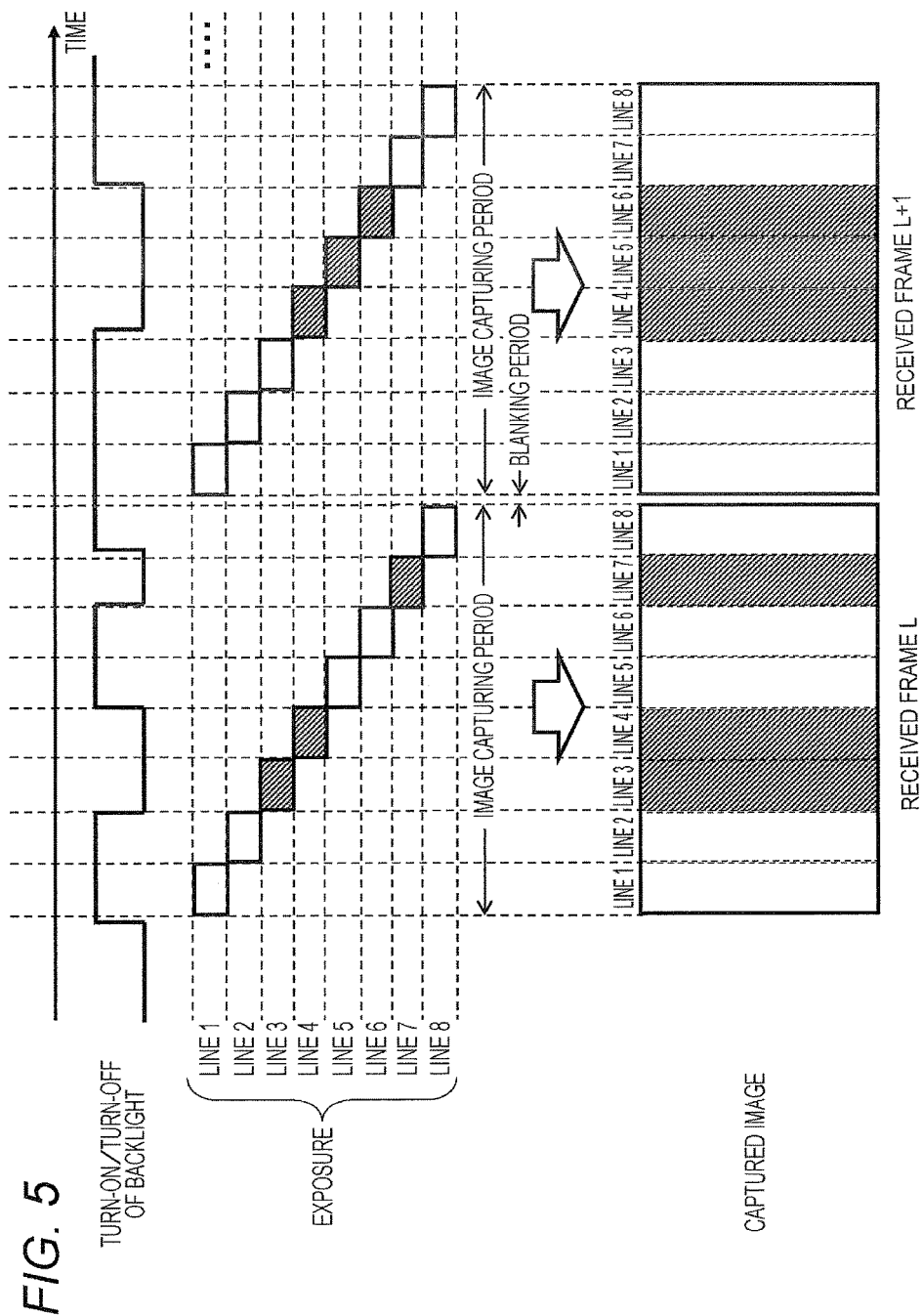
FIG. 5 is a diagram illustrating a captured image in the receiver, which corresponds to turn-on/turn-off of a backlight of the display device according to the first exemplary embodiment.

FIG. 5 is a diagram illustrating the captured image of receiver 200, which corresponds to turn-on/turn-off of backlight 190 of display device 100.

Image capturing unit 210 is the rolling shutter-type image sensor, and exposes the video while scanning the video temporally one line by one line. In this exemplary embodiment, for simplifying the explanation, the description will be given on the assumption that exposure elements of the image sensor consist of eight lines. It is assumed that such exposure lines are formed into a longitudinal band shape in receiver 200.

As shown in FIG. 5, backlight 190 of display device 100 is turned on and turned off with the elapse of time. Image sensor exposes the video using a rolling shutter from the first line to the eighth line. When the exposure of the eight lines is finished, captured image generator 220 of receiver 200 generates the captured image based on the eight-line exposure data items. Here, a period of such exposure using a rolling shutter of the image sensor is defined as an image capturing period, and the captured image generated based on the exposure data items obtained by exposing the video using a rolling shutter by the image sensor during this image capturing period is defined as a received frame L. When the exposure of the image sensor is performed up to the eighth line, the exposure returns to the first line, and next exposure is started from the first line. A captured image generated next is defined as a received frame L+1. During a period since the exposure up to the eighth line is finished until the next exposure of the first line is started, there is a blanking period such as a period of time for which the exposure data items are stored in the memory, and during this blanking period, the video is not exposed.

In received frame L, with regard to the exposure of the image sensor of receiver 200, each of the first line, the second line, the fifth line, the sixth line, and the eighth line is light since backlight 190 of display device 100 is turned on then. With regard to the exposure of the image sensor of receiver 200, each of the third line and the fourth line is dark since backlight 190 of display device 100 is turned off then. The visible light communication signal is decoded based on received frame L.

In received frame L+1, with regard to the exposure of the image sensor of receiver 200, each of the first line, the second line, the third line, the seventh line, and the eighth line is light since backlight 190 of display device 100 is turned on then. With regard to the exposure of the image sensor of receiver 200, each of the fourth line, the fifth line, and the sixth line is dark since backlight 190 of display device 100 is turned off then. The visible light communication signal is decoded based on received frame L+1.

[1-4-2. Captured Image Corresponding to Transmission Frame]

Figure 6:
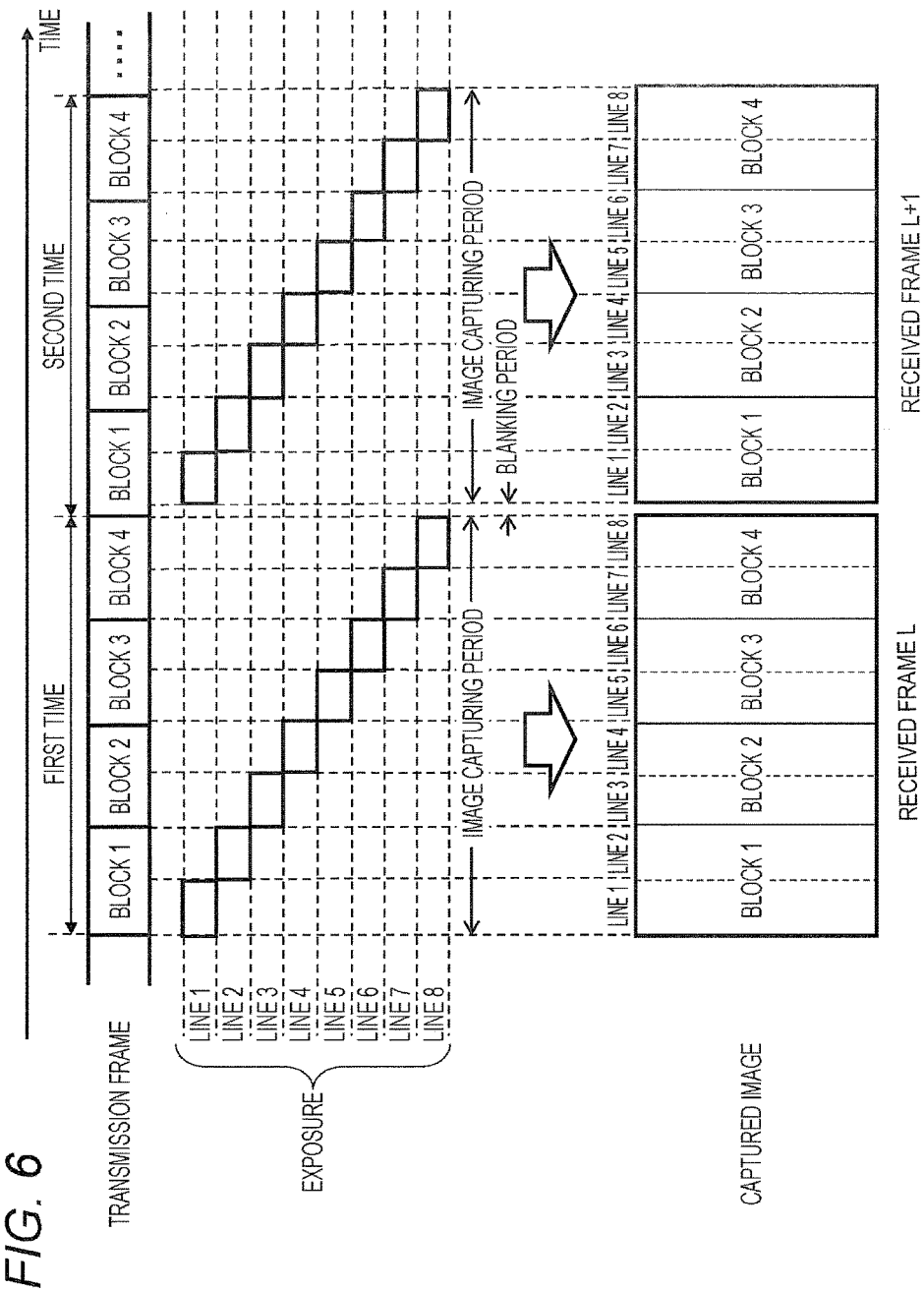
FIG. 6 is a diagram illustrating a captured image in the receiver, which corresponds to a transmission frame of the display device according to the first exemplary embodiment.

FIG. 6 is a diagram illustrating the captured image in receiver 200, which corresponds to the transmission frame of display device 100. As illustrated in FIG. 3, the visible light communication signal includes the plurality of signal units, one signal unit is divided into four data items, and is encoded, and the four data items are converted into four blocks.

In the visible light communication region that is display surface 110 of display device 100, there is a case where there occurs a period during which the turn-on/turn-off of backlight 190 cannot be determined by using contents of the video signal. There is a possibility that receiver 200 cannot receive the transmission frame output from display device 100 during this period.

Accordingly, for the transmission frame output from backlight 190 of display device 100, there is used a Carousel method of repeatedly outputting the transmission frame, which is generated from one signal unit, a plurality of times. In FIG. 6, display device 100 outputs the transmission frame continuously twice while taking the visible light communication signal as one signal unit.

As shown in FIG. 6, the transmission frame is output by the turn-on/turn-off of backlight 190 of display device 100 with the elapse of time. The image sensor of receiver 200 performs the exposure using a rolling shutter from the first line to the eighth line. When the exposure of the image sensor is performed up to the eighth line, captured image generator 220 of receiver 200 generates the captured image based on such eight-line exposure data items. Received frame L that is the captured image receives block 1 by the first and second lines of the exposure of the image sensor of receiver 200, receives block 2 by the third and fourth lines thereof, receives block 3 by the fifth and sixth lines thereof, and receives block 4 by the seventh and eighth lines thereof. Received frame L corresponds to the first transmission frame of one signal unit output from display device 100.

Moreover, in FIG. 6, received frame L+1 that is the captured image receives block 1 by the first and second lines of the exposure of the image sensor of receiver 200, receives block 2 by the third and fourth lines thereof, receives block 3 by the fifth and sixth lines thereof, and receives block 4 by the seventh and eighth lines thereof. Received frame L+1 corresponds to the second transmission frame of one signal unit output from display device 100.

As described above, the transmission frame generated from one signal unit is output continuously by the Carousel method. In such a way, even if a radio disturbance occurs for the transmission of the first transmission frame, a block that cannot be received in the first transmission frame can be received in the second transmission frame. For the transmission frame as a sum of the first and second transmission frames, all of the blocks, that is, four blocks are received, whereby one signal unit can be decoded.

Moreover, in a case of outputting the transmission frame continuously by the Carousel method, display device 100 may output a reset signal, which indicates that switching is performed from the current signal unit to the next signal unit, before outputting the transmission frame of the next signal unit.

This reset signal may be included in the preamble and the data item of the block of the transmission frame.

[1-5. Subject in Output and Received of Visible Light Communication Signal]

Figure 7:
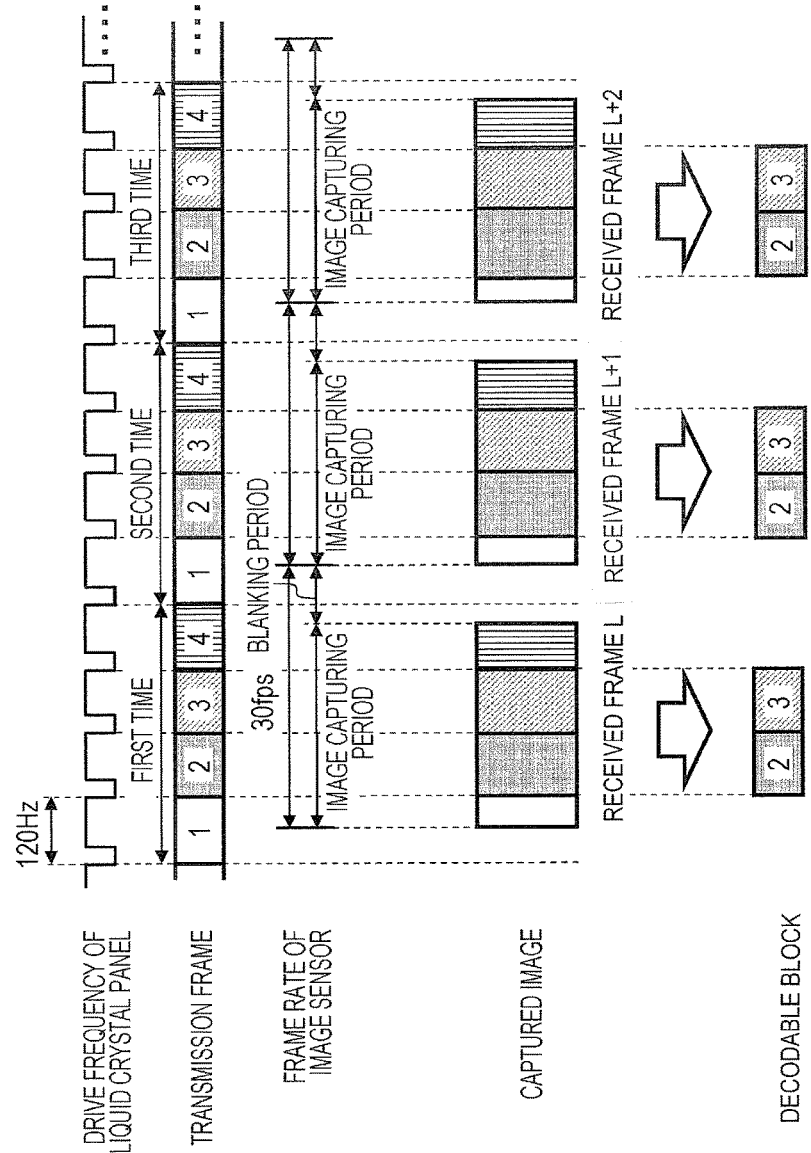
FIG. 7 is a diagram illustrating a relationship between a frequency of a transmission clock of the display device and a frame rate of an image capturing unit of the receiver according to the first exemplary embodiment.

Next, a description will be given of a subject in the output and received of visible light communication signal. FIG. 7 is a diagram illustrating a relationship between a frequency of a transmission clock of display device 100 and a frame rate of image capturing unit 210 of receiver 200.

A drive frequency of a liquid crystal panel that is display panel 150 of display device 100 in this exemplary embodiment is 120 Hz.

Note that, depending on types, some liquid crystal panels operate at a drive frequency of 60 Hz, and some liquid crystal panels operate at a drive frequency of 240 Hz.

Moreover, the image sensor of image capturing unit 210 of receiver 200 in this exemplary embodiment operates at a frame rate of 30 fps (frame per second).

At this time, a relationship between the drive frequency of the liquid crystal panel and the frame rate of the image sensor is a relationship of mutually integer multiples or integer divisions. Moreover, for brightness control in backlight controller 180 of display device 100, and control for a moving picture resolution and the like, timing of turning on and turning off backlight 190 of display device 100 is sometimes synchronized with the drive frequency of the liquid crystal panel. That is, as shown in FIG. 7, the transmission frame of display device 100 is output in synchronization with the drive frequency of the liquid crystal panel. FIG. 7 shows a case where the transmission frame generated from one signal unit output from display device 100 in such a situation is output three times by the Carousel method.

For the first transmission frame output from display device 100, the exposure of the image sensor is performed during an image capturing period at one frame rate. Receiver 200 generates received frame L, which is the captured image, based on the exposure data items. Receiver 200 decodes the visible light communication signal from received frame L. Only block 2 and block 3, in which all of the data items are included in received frame L, can be decoded as the visible light communication signal.

For the second transmission frame output from display device 100, the exposure of the image sensor is performed during the image capturing period at one frame rate. Receiver 200 generates received frame L+1, which is the captured image, based on the exposure data items. Receiver 200 decodes the visible light communication signal from received frame L+1. Only block 2 and block 3, in which all of the data items are included in received frame L+1, can be decoded as the visible light communication signal.

For the third transmission frame output from display device 100, the exposure of the image sensor is performed during the image capturing period at one frame rate. Receiver 200 generates received frame L+2, which is the captured image, based on the exposure data items. Receiver 200 decodes the visible light communication signal from received frame L+2. Only block 2 and block 3, in which all of the data items are included in received frame L+2, can be decoded as the visible light communication signal.

As described above, in a case where the relationship between the drive frequency of the liquid crystal panel and the frame rate of the image sensor is a relationship of mutually integer multiples or integer divisions, and in a case where the transmission frame corresponding to one signal unit output from display device 100 is output in synchronization with the drive frequency of the liquid crystal panel, even if the same transmission frame is output three times by the Carousel method, among block 1, block 2, block 3 and block 4, only block 2 and block 3 can be decoded as the visible light communication signal. Block 1 and block 4 cannot be decoded as the visible light communication signal.

[1-6. Generation Method of Transmission Frame]

In order to solve the above-described problem, that is, in order to decode all four blocks, which are included in one signal unit output from display device 100, as the visible light communication signal in receiver 200, the same transmission frame is not used every time as the transmission frame output for one signal unit a plurality of times by the Carousel method, but different transmission frames are generated and output every time. That is, with regard to the transmission frame output for one signal unit a plurality of times by the Carousel method, the transmission frame is generated so that the transmission order of the blocks of the transmission frame corresponding to one signal unit cannot be the same every time.

Figure 8:
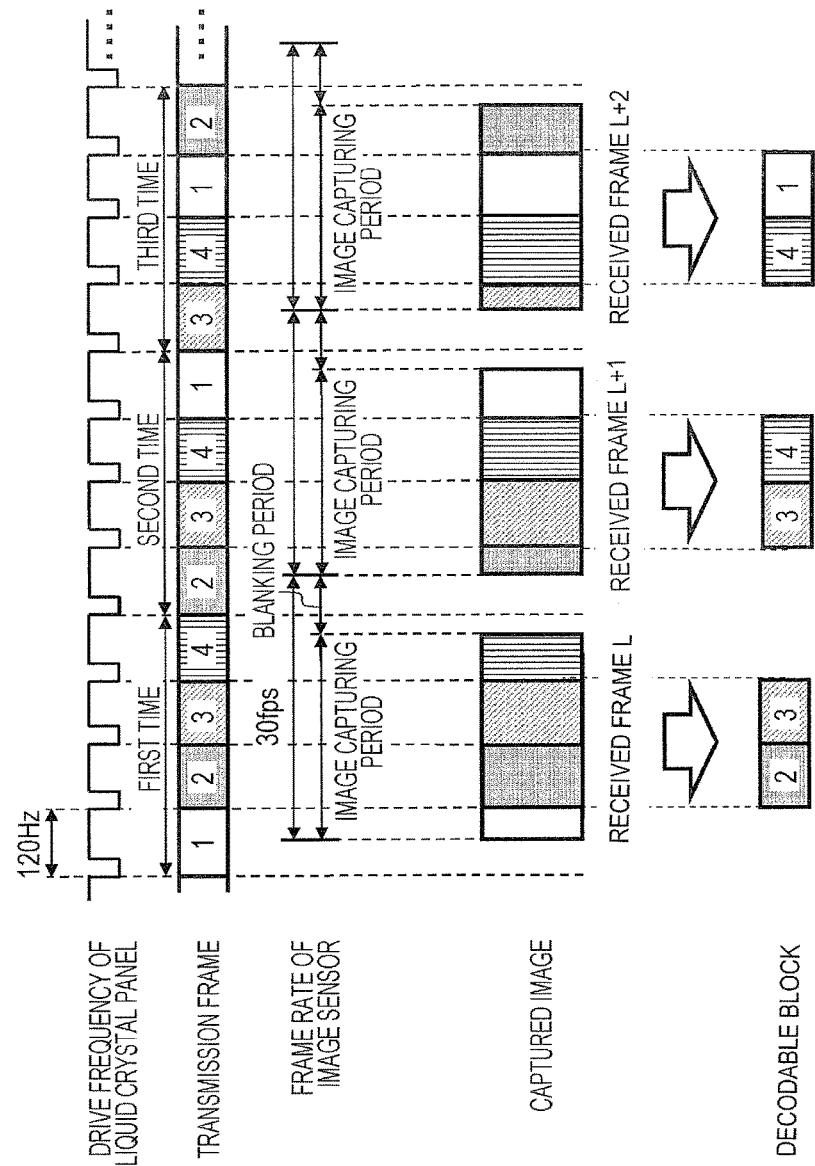
FIG. 8 is a diagram illustrating a first generation example of a transmission frame corresponding to one signal unit according to the first exemplary embodiment.

FIG. 8 is a diagram illustrating a first generation example of the transmission frame corresponding to one signal unit according to the first exemplary embodiment. FIG. 8 shows a case where one signal unit output from display device 100 is output three times by the Carousel method in a similar way to the case of FIG. 7. A different point of FIG. 8 from FIG. 7 is that the transmission order of the blocks of such three transmission frames output from display device 100 is not the same but different every time.

An order of the blocks of the first transmission frame output from display device 100 is block 1, block 2, block 3, and block 4. For the first transmission frame output from display device 100, receiver 200 performs the exposure of the image sensor during the image capturing period at one frame rate. Receiver 200 generates received frame L, which is the captured image, based on the exposure data items. Receiver 200 decodes the visible light communication signal from received frame L. Only block 2 and block 3, in which all of the data items are included in received frame L, can be decoded as the visible light communication signal.

An order of the blocks of the second transmission frame output from display device 100 is block 2, block 3, block 4 and block 1. For a second signal unit output from display device 100, the exposure of the image sensor is performed during the image capturing period at one frame rate. Receiver 200 generates received frame L+1, which is the captured image, based on the exposure data items. Receiver 200 decodes the visible light communication signal from received frame L+1. Only block 3 and block 4, in which all of the data items are included in received frame L+1, can be decoded as the visible light communication signal.

An order of the blocks of the third transmission frame output from display device 100 is block 3, block 4, block 1 and block 2. For the third transmission frame output from display device 100, the exposure of the image sensor is performed during the image capturing period at one frame rate. Receiver 200 generates received frame L+2, which is the captured image, based on the exposure data items. Receiver 200 decodes the visible light communication signal from received frame L+2. Only block 4 and block 1, in which all of the data items are included in received frame L+2, can be decoded as the visible light communication signal.

In a case where the relationship between the drive frequency of the liquid crystal display panel and the frame rate of the image sensor is a relationship of mutually integer multiples or integer divisions, and in a case where the transmission frame is output from display device 100 in synchronization with the drive frequency of the liquid crystal panel, if the transmission frame corresponding to one signal unit is output three times by the Carousel method while changing the transmission order of the blocks every time, then all of block 1, block 2, block 3, and block 4 of one signal unit can be decoded as the visible light communication signal.

In the generation example of FIG. 8, the second and third blocks of the transmission frame output from display device 100 are the blocks which can be decoded as the visible light communication signal. Accordingly, the transmission order of the blocks of the signal unit is changed so that all of the blocks can be output for the second time and the third time in the output performed three times.

Note that, in the generation example of FIG. 8, with regard to the transmission frame output for one signal unit a plurality of times by the Carousel method, the transmission order of the blocks of the transmission frame corresponding to one signal unit is changed so as not to be the same every time; however, a way of changing the transmission order is not limited to this. With regard to the transmission frame output for one signal unit a plurality of times by the Carousel method, the transmission order of the blocks may be changed so that transmission orders of the blocks of two adjacent transmission frame corresponding to one signal unit can be different from each other.

Moreover, the generation example of the transmission frame output from display device 100 is not limited to this.

FIG. 9A is a diagram illustrating a second generation example of the transmission frame corresponding to one signal unit according to the first exemplary embodiment.

With regard to the transmission order of the block of the transmission frame, FIG. 9A repeats an ascending order, that is, an order of block 1, block 2, block 3, and block 4, and a descending order, that is, an order of block 4, block 3, block 2, and block 1.

In a case where the received frame generated by receiver 200 includes a first-half portion or second-half portion of the transmission frame, the transmission frame as in the second generation example is output a plurality of times by the Carousel method, whereby all of block 1, block 2, block 3, and block 4 of one signal unit can be decoded as the visible light communication signal.

FIG. 9B is a diagram illustrating a third generation example of the transmission frame corresponding to one signal unit according to the first exemplary embodiment. FIG. 9B omits one block among four blocks of the signal unit, and changes the transmission order for each transmission frame. An order of the blocks of the first transmission frame output from display device 100 is block 1, block 2, block 3, and block 2 by omitting block 4. An order of the blocks of the second transmission frame output from display device 100 is block 3, block 4, block 1, and block 3 by omitting block 2. An order of the blocks of the third transmission frame output from display device 100 is block 4, block 1, block 2, and block 4 by omitting block 3. The transmission order is changed as described above, whereby all of the blocks can be transmitted a same number of times.

FIG. 9C is a diagram illustrating a fourth generation example of the transmission frame corresponding to one signal unit according to the first exemplary embodiment. FIG. 9C arrays the blocks of the signal unit in order of block 1, block 2, block 3, and block 4, and adds one block to the arrayed blocks. An order of the blocks of the first transmission frame output from display device 100 is block 1, block 1, block 2, and block 3 by adding block 1. An order of the blocks of the second transmission frame output from display device 100 is block 4, block 1, block 2, and block 2 by beginning from block 4, which is not included in the first transmission frame, and by adding block 2. An order of the blocks of the third transmission frame output from display device 100 is block 3, block 4, block 1, and block 2 by beginning from block 3, which is not included in the second transmission frame.

As described above, while the transmission frame as in the fourth generation example is output a plurality of times by the Carousel method, all of block 1, block 2, block 3, and block 4 of one signal unit can be decoded as the visible light communication signal.

FIG. 9D is a diagram illustrating a fifth generation example of the transmission frame corresponding to one signal unit according to the first exemplary embodiment. FIG. 9D randomly changes the order of the blocks of the signal unit. An order of the blocks of the first transmission frame output from display device 100 is block 1, block 3, block 2, and block 4. An order of the blocks of the second transmission frame output from display device 100 is block 3, block 1, block 2, and block 4. An order of the blocks of the third transmission frame output from display device 100 is block 2, block 3, block 1, and block 4. While the transmission frame corresponding to one signal unit is output a plurality of times by the Carousel method while randomly changing the order of the blocks of the transmission frame, all of block 1, block 2, block 3, and block 4 of one signal unit can be decoded as the visible light communication signal.

FIG. 9E is a diagram illustrating a sixth generation example of the transmission frame corresponding to one signal unit according to the first exemplary embodiment. FIG. 9E shows a case of two consecutive same blocks in one transmission frame. An order of the blocks of the first transmission frame output from display device 100 is block 1, block 1, block 2, and block 2. An order of the blocks of the second transmission frame output from display device 100 is block 3, block 3, block 4, and block 4. An order of the blocks of the third transmission frame output from display device 100 is block 1, block 1, block 2, and block 2.

[1-7. Operation of Visible Light Communication Signal Processor]

Figure 10:
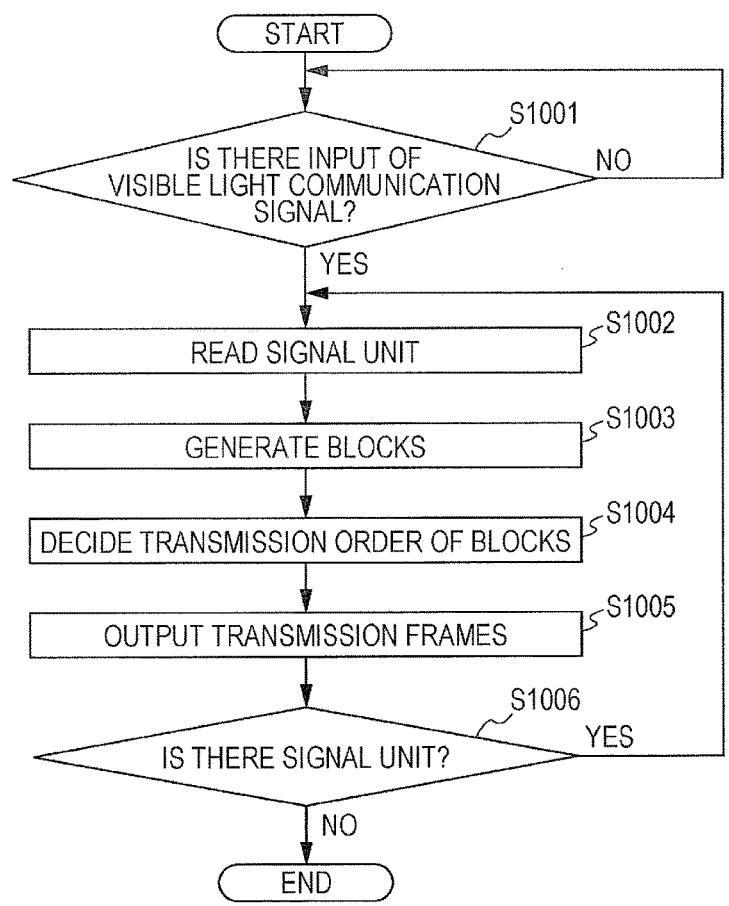
FIG. 10 is a flowchart illustrating operations of a visible light communication signal processor of the display device according to the first exemplary embodiment.

Next, a description will be given of operations of visible light communication signal processor 170 of display device 100. FIG. 10 is a flowchart illustrating the operations of visible light communication signal processor 170 of display device 100.

(Step S1001) Visible light communication signal processor 170 determines whether or not the visible light communication signal is input from visible light communication signal input unit 160. If it is determined that the visible light communication signal is "input" (if Yes), the processing proceeds to Step S1002. If it is determined that the visible light communication signal is "not input" (if No), the processing of step S1001 is repeated.

(Step S1002) The input visible light communication signal includes a plurality of the signal units. Visible light communication signal processor 170 reads one signal unit.

(Step S1003) Visible light communication signal processor 170 divides the read one signal unit into the predetermined number of data items, encodes the respective data items, adds the header portions to the data items, and generates the blocks.

(Step S1004) Based on the generated blocks, visible light communication signal processor 170 decides the transmission order of the blocks included in each of the plurality of transmission frames transmitted by the Carousel method.

(Step S1005) Visible light communication signal processor 170 generates the plurality of transmission frames, and outputs the generated transmission frames to backlight controller 180.

(Step S1006) Visible light communication signal processor 170 determines whether or not the remaining signal units are present. If it is determined that the remaining signal units are "present" (if Yes), the processing returns to Step S1001. If it is determined that the remaining signal units are "not present" (if No), the processing is ended.

[1-8. Effect and the Like]

As described above, the display device in this exemplary embodiment is a display device, which is capable of outputting, by the Carousel method, the visible light communication signal including the plurality of signal units. The display device includes the display panel that displays the video signal, the visible light communication processor that encodes the signal units, divides the encoded signal units into the plurality of blocks, generates the plurality of transmission frames by using the plurality of blocks, and uses the generated transmission frames as the backlight control signal, and the backlight that illuminates the display panel from the back surface of the display panel based on the backlight control signal. With regard to the plurality of transmission frames corresponding to one of the signal units generated by the visible light communication processor, an order of the plurality of blocks is different between at least two of the transmission frames.

In such a way, display device 100 outputs the plurality of transmission frames, which are different in transmission order of the blocks, for one signal unit, whereby receiver 200 can decode the visible light communication signal.

Moreover, in the display device in this exemplary embodiment, the plurality of transmission frames corresponding to one signal unit generated by the visible light communication processor include the same block in at least two adjacent transmission frames.

In such a way, display device 100 allows the at least two adjacent transmission frames to include the same block for one signal unit, whereby receiver 200 can decode the visible light communication signal.

Moreover, in the display device in this exemplary embodiment, the plurality of transmission frames corresponding to one signal unit generated by the visible light communication processor include the plurality of same blocks in the at least one transmission frame, and the plurality of transmission frames include all of the plurality of blocks.

In such a way, display device 100 allows one transmission frame to include the plurality of same blocks, and allows the plurality of transmission frames to include all of the blocks, whereby receiver 200 can decode the visible light communication signal.

Moreover, in display device 100 in this exemplary embodiment, the visible light communication signal processor inserts the reset signal between the two adjacent signal units.

In such a way, display device 100 can indicate that the switching is performed from the current signal unit to the next signal unit.

Display device 100 of this exemplary embodiment is particularly effective in the case where the relationship between the drive frequency of the liquid crystal panel and the frame rate of the image sensor is a relationship of mutually integer multiples or integer divisions, and in the case where the transmission frame is output from display device 100 in synchronization with the drive frequency of the liquid crystal panel.

Note that, in this exemplary embodiment, the description has been given on the assumption that the number of transmission times of the transmission frame output from display device 100 by the Carousel method is three; however, the number of transmission times is not limited to this. The number of transmission times of the transmission frame output by the Carousel method may be any as long as the number is plural.

Second Exemplary Embodiment

Figure 11:
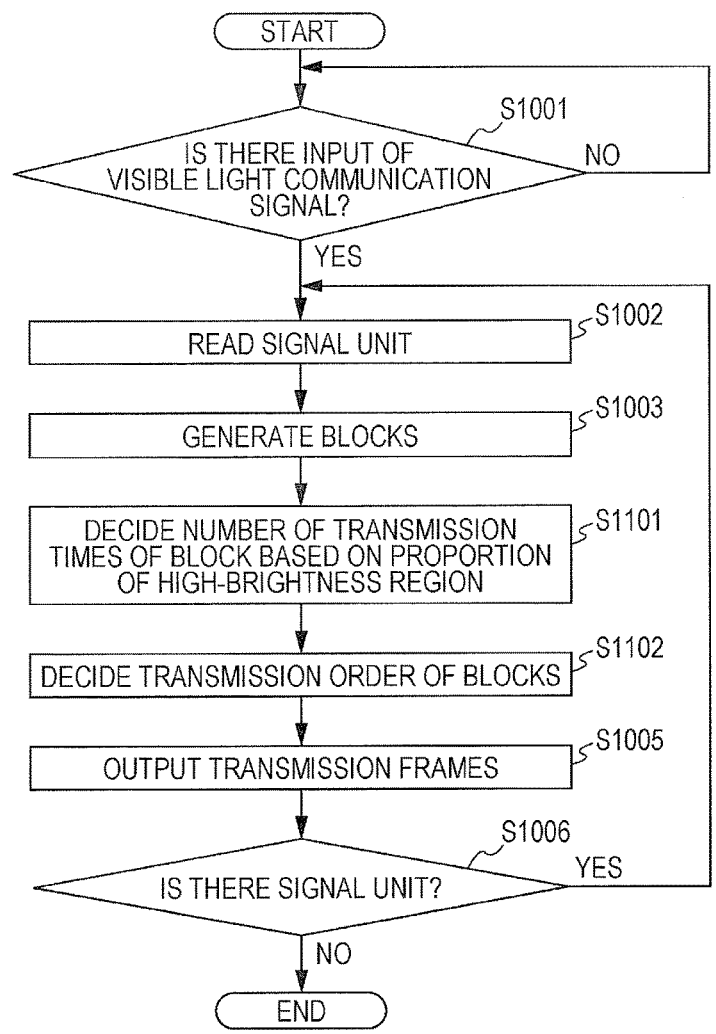
FIG. 11 is a flowchart illustrating operations of a visible light communication signal processor of a display device according to a second exemplary embodiment.

A description will be given below of a second exemplary embodiment with reference to FIG. 11 to FIG. 13.

[2-1. Configuration of Visible Light Communication System]

A visible light communication system in this exemplary embodiment has a same configuration as that of visible light communication system 10 described in the first exemplary embodiment. A description will be mainly given of different points in the visible light communication system in this exemplary embodiment.

[2-2. Relationship Between Brightness of Image and Output of Visible Light Communication Signal]

Display panel 150 of display device 100 in this exemplary embodiment is a liquid crystal panel. In the liquid crystal panel, in an event of displaying a video, a shutter of liquid crystal of display surface 110 is opened and closed, or alternatively, control of gradation and control of backlight 190 are performed, whereby the video is visually recognized.

Therefore, even if backlight 190 is set extremely light, in a case where the video signal is dark, then a dark region is formed in the visible light communication region. In such a dark region of the video signal, the light of backlight 190 is shielded by the shutter of the liquid crystal of display panel 150. In a case of outputting the visible light communication signal to the dark region, the visible light communication signal cannot sometimes be decoded from the captured image imaged by image capturing unit 210 of receiver 200.

Accordingly, in this exemplary embodiment, in a case where a proportion of a high-brightness region that is a region having predetermined lightness or more to the visible light communication region as the whole of display surface 110 of display device 100 is small, the number of transmission times of the blocks included in one signal unit is set to a plurality of times, whereby the visible light communication signal can be decoded. On the contrary, in a case where the proportion of the high-brightness region to the visible light communication region is large, in comparison with the case where the proportion of the high-brightness region is small, the number of transmission times of the block included in one signal unit is reduced, or the number of transmission times of the block included in one signal unit is set to once.

[2-3. Operation of Visible Light Communication Signal Processor]

A main different point of the second exemplary embodiment from the first exemplary embodiment is operations of visible light communication signal processor 170. Next, a description will be given of operations of visible light communication signal processor 170. FIG. 11 is a flowchart illustrating the operations of visible light communication signal processor 170 of display device 100 according to the second exemplary embodiment.

Operations of Step S1001 to Step S1003 are the same as the operations of the first exemplary embodiment.

(Step S1101) Visible light communication signal processor 170 detects the high-brightness region of the visible light communication region from the video signal input from video signal processor 130. Visible light communication signal processor 170 decides the number of transmission times of each block of the transmission unit based on the proportion of the high-brightness region in the visible light communication region. A decision method of the number of transmission times will be described later.

(Step S1102) Visible light communication signal processor 170 decides the transmission order of the blocks based on the number of transmission times of each block in the signal unit. A decision method of the transmission order of the blocks will be described later.

Operations of Step S1005 and Step S1006 are the same as the operations in the first exemplary embodiment.

[2-4. Decision Method of Number of Transmission Times of Blocks]

Next, a description will be given of a decision method of the number of transmission times of the blocks. FIG. 12 is a diagram illustrating an example of a method for deciding a number of transmission times of arbitrary blocks of the transmission frame corresponding to one signal unit.

Figure 12:
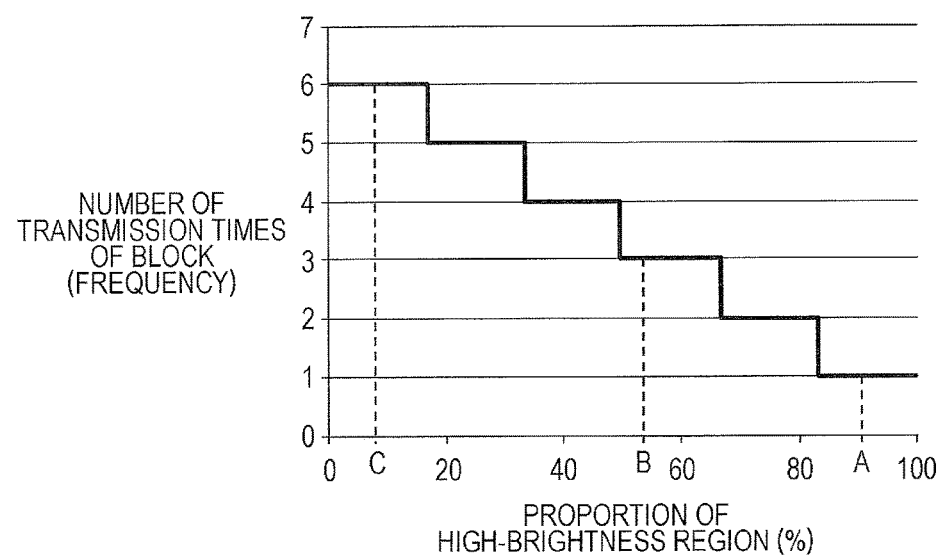
FIG. 12 is a diagram illustrating an example of a method for deciding a number of transmission times of arbitrary blocks of a transmission frame corresponding to one signal unit according to the second exemplary embodiment.

In FIG. 12, an axis of abscissas indicates the proportion of the high-brightness region of the visible light communication region, and an axis of ordinates indicates the number of transmission times of the arbitrary blocks in the signal unit.

FIG. 12 is based on an assumption that the visible light communication signal can be decoded by receiver 200 under a condition where the number of transmission times of the arbitrary blocks in the signal unit is once if the high-brightness region occupies approximately 80% or more of the visible light communication region. Then, FIG. 12 is based on an assumption that the visible light communication signal can be decoded by receiver 200 by increasing the number of transmission times of the arbitrary blocks in the signal unit as the proportion of the high-brightness region in the visible light communication region is reduced. Specifically, if the high-brightness region occupies 90% (point A) of the visible light communication region, then the number of transmission times of the arbitrary blocks in the signal unit is defined to be once. If the high-brightness region occupies 50% (point B) of the visible light communication region, then the number of transmission times of the arbitrary blocks in the signal unit is defined to be three times. If the high-brightness region occupies 10% (point C) of the visible light communication region, then the number of transmission times of the arbitrary blocks in the signal unit is defined to be six times. In FIG. 12, the number of transmission times of the arbitrary blocks in the signal unit is increased once by once in a proportion of 80% to approximately 15% as the proportion of the high-brightness region in the visible light communication region.

Note that the frequency of the number of transmission times is not limited to this, and may be changed as appropriate.

[2-5. Decision Method of Transmission Order of Blocks]

Next, a description will be given of a decision method of the transmission order of the blocks corresponding to one signal unit. FIG. 13 is a diagram illustrating a generation example of the transmission frame corresponding to one signal unit according to the second exemplary embodiment. The drive frequency of the liquid crystal panel, which is display panel 150 of display device 100 in this exemplary embodiment, is 120 Hz, and the image sensor of image capturing unit 210 of receiver 200 operates at a frame rate of 30 fps. Moreover, the transmission frame of display device 100 is output in synchronization with the drive frequency of the liquid crystal panel. FIG. 13 shows a case where one signal unit of the visible light communication signal output from display device 100 is output three times by the Carousel method. It is assumed that one signal unit includes six data items with a same data length, and is encoded to generate six blocks.

Figure 13:
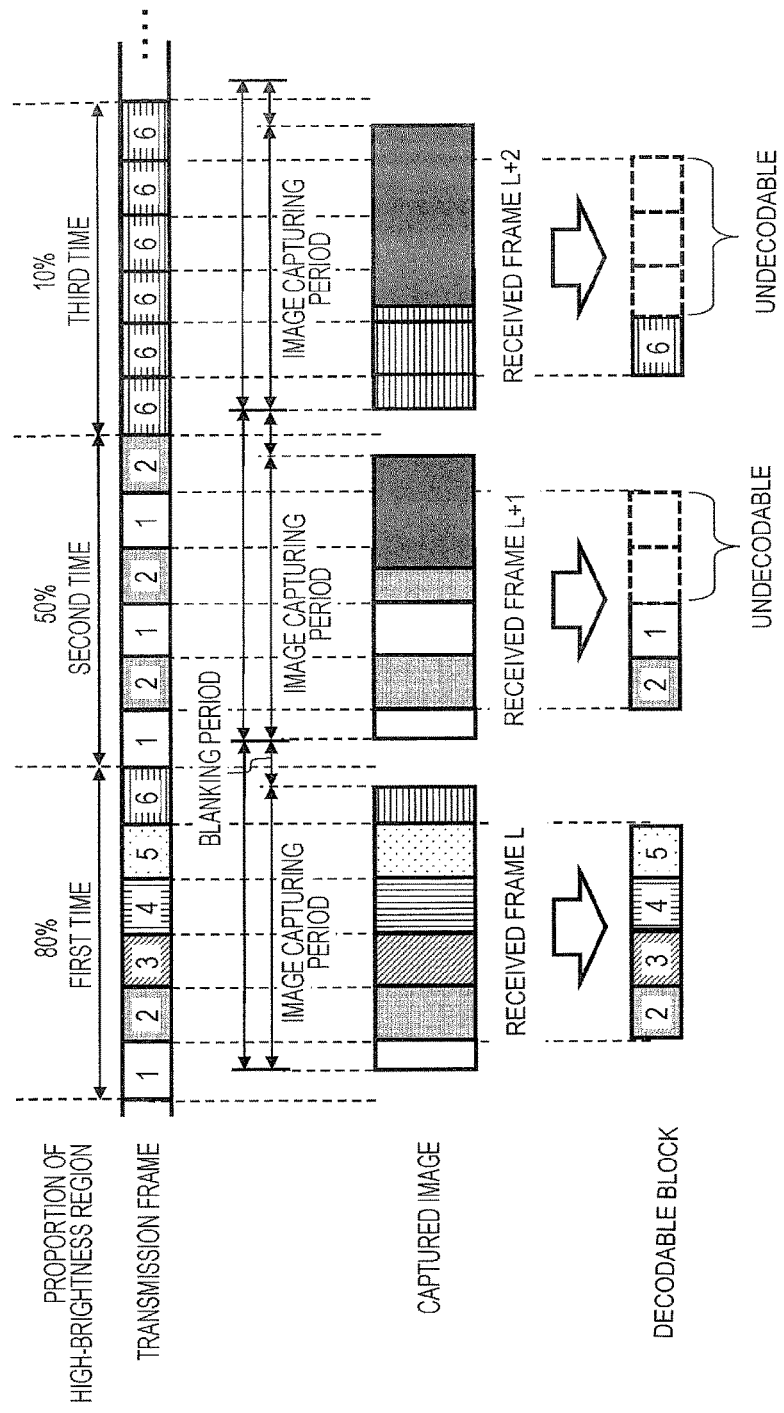
FIG. 13 is a diagram illustrating a generation example of the transmission frame corresponding to one signal unit according to the second exemplary embodiment.

In FIG. 13, the number of transmission times of the blocks included in the three transmission frames corresponding to one signal unit is decided in response to the proportion of the high-brightness region in the visible light communication region.

In the first transmission frame output from display device 100, the number of transmission times of the arbitrary blocks of the signal unit is once since the proportion of the high-brightness region is 80%. Hence, an order of the blocks of the first transmission frame output from display device 100 is block 1, block 2, block 3, block 4, block 5, and block 6. For the first transmission frame output from display device 100, receiver 200 performs the exposure of the image sensor during the image capturing period at one frame rate. Receiver 200 generates received frame L, which is the captured image, based on the exposure data items. Receiver 200 decodes the visible light communication signal from received frame L. Block 2, block 3, block 4, and block 5, in which all of the data items are included in received frame L, can be decoded as the visible light communication signal.

Next, in the second transmission frame output from display device 100, the number of transmission times of the arbitrary blocks of the signal unit is three times since the proportion of the high-brightness region is 50%. Hence, as an order of the blocks of the second transmission frame output from display device 100, block 1 and block 2 are sequentially repeated three times. For the second transmission frame output from display device 100, receiver 200 performs the exposure of the image sensor during the image capturing period at one frame rate. Receiver 200 generates received frame L+1, which is the captured image, based on the exposure data items. Such blocks in regions which are not the high-brightness region in received frame L+1 cannot be decoded. Receiver 200 decodes the visible light communication signal from received frame L+1. Block 1 and block 2, in which all of the data items are included in received frame L+1, can be decoded as the visible light communication signal.

Next, in the third transmission frame output from display device 100, the number of transmission times of the arbitrary blocks of the signal unit is six times since the proportion of the high-brightness region is 10%. Hence, as an order of the blocks of the third transmission frame output from display device 100, block 6 is continuously repeated six times. For the third transmission frame output from display device 100, receiver 200 performs the exposure of the image sensor during the image capturing period at one frame rate. Receiver 200 generates received frame L+2, which is the captured image, based on the exposure data items. The blocks in regions which are not the high-brightness region in received frame L+2 cannot be decoded. Receiver 200 decodes the visible light communication signal from received frame L+2. Block 6, in which all of the data items are included in received frame L+2, can be decoded as the visible light communication signal.

When the transmission frame corresponding to one signal unit is output three times by the Carousel method while deciding the transmission order of the blocks based on the proportion of the high-brightness region, all of block 1, block 2, block 3, block 4, block 5, and block 6 of one signal unit can be decoded as the visible light communication signal.

[2-6. Effect and the Like]

As described above, in the display device of this exemplary embodiment, visible light communication processor detects the region of the display panel, which has the predetermined brightness or more, and in response to a size of the region, decides the number of same blocks to be included in the transmission frame, and generates the plurality of transmission frames corresponding to the signal unit.

In such a way, for one signal unit, display device 100 changes the number of transmission times of the blocks in response to the proportion of the high-brightness region, and outputs the plurality of transmission frames, whereby receiver 200 can decode the visible light communication signal.

Note that, in this exemplary embodiment, the three transmission frames are output by the Carousel method for one signal unit output from display device 100 in this exemplary embodiment; however, the output transmission frames are not limited to this. For example, for one signal unit, more than three transmission frames may be output by the Carousel method. Then, in the second transmission frame, a sequential block combination other than such a sequential combination of block 1 and block 2 may be repeated three times.

Display device 100 of this exemplary embodiment is particularly effective in the case where the relationship between the drive frequency of the liquid crystal panel and the frame rate of the image sensor is a relationship of mutually integer multiples or integer divisions, and in the case where the transmission frame is output from display device 100 in synchronization with the drive frequency of the liquid crystal panel.

Third Exemplary Embodiment

A description will be given below of a third exemplary embodiment with reference to FIG. 14 to FIG. 17.

[3-1. Configuration of Visible Light Communication System]

A visible light communication system in this exemplary embodiment has a same configuration as that of visible light communication system 10 described in the first exemplary embodiment. A description will be mainly given of different points in the visible light communication system in this exemplary embodiment.

[3-2. Relationship of Transmission of Visible Light Communication Signal with Distance from Display Device]

A comparison is made between a case where a distance between display device 100 and receiver 200 is relatively short and a case where the distance is relatively long. In comparison with the case where the distance between display device 100 and receiver 200 is relatively long, in the case where the distance between display device 100 and receiver 200 is relatively short, the blocks included in the captured image captured by receiver 200 are increased.

A reason for this is as follows. Specifically, in the case where the distance between display device 100 and receiver 200 is relatively short, the captured image that can be generated by image capturing unit 210 of receiver 200 becomes relatively large, and in the case where the distance between display device 100 and receiver 200 is relatively long, the captured image that can be generated by image capturing unit 210 of receiver 200 becomes relatively small.

Accordingly, display device 100 in this exemplary embodiment changes the number of transmission times of the arbitrary blocks in the transmission frame of one signal unit in response to the distance between display device 100 and receiver 200.

[3-3. Operation of Visible Light Communication Signal Processor]

Figure 14:
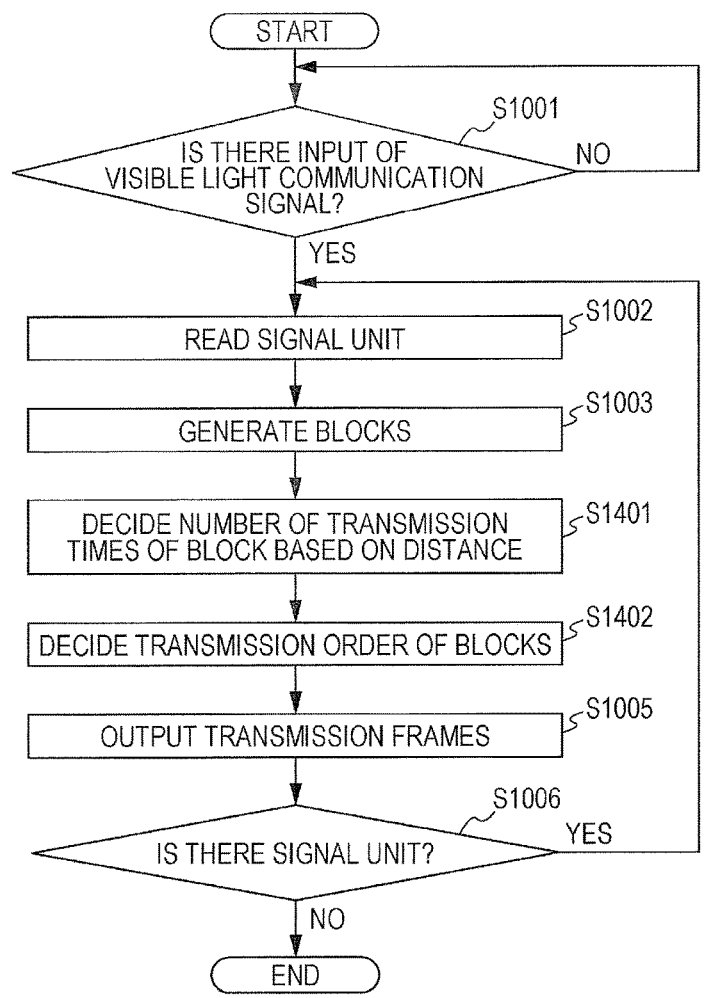
FIG. 14 is a flowchart illustrating operations of a visible light communication signal processor of a display device according to a third exemplary embodiment.

A main different point of the third exemplary embodiment from the first exemplary embodiment is operations of visible light communication signal processor 170. A description will be given of operations of visible light communication signal processor 170. FIG. 14 is a flowchart illustrating the operations of visible light communication signal processor 170 of display device 100 according to the third exemplary embodiment.

Operations of Step S1001 to Step S1003 are the same as the operations of the first exemplary embodiment.

(Step S1401) Visible light communication signal processor 170 decides the number of transmission times of each block of the transmission unit in response to the distance between display device 100 and receiver 200. A decision method of the number of transmission times will be described later.

(Step S1402) Visible light communication signal processor 170 decides the transmission order of the blocks based on the number of transmission times of each block in the signal unit. A decision method of the transmission order will be described later.

Operations of Step S1005 and Step S1006 are the same as the operations in the first exemplary embodiment.

[3-4. Decision Method of Number of Transmission Times of Blocks]

Figure 15:
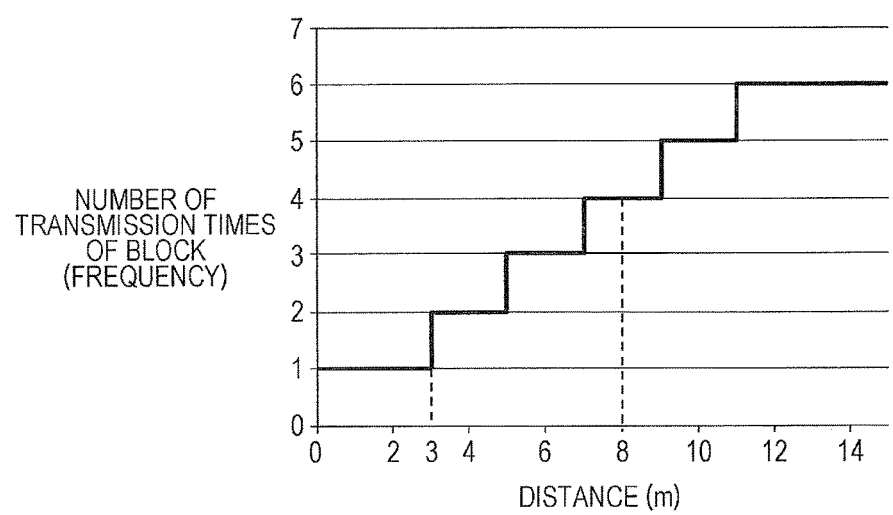
FIG. 15 is a diagram illustrating an example of a method for deciding a number of transmission times of arbitrary blocks of a transmission frame corresponding to one signal unit according to the third exemplary embodiment.

Next, a description will be given of a decision method of the number of transmission times of the blocks. FIG. 15 is a diagram illustrating an example of a method for deciding the number of transmission times of the arbitrary blocks of the transmission frame corresponding to one signal unit.

In FIG. 15, an axis of abscissas indicates the distance between display device 100 and receiver 200, and an axis of ordinates indicates the number of transmission times of the arbitrary blocks in the signal unit. In a case where the distance is short, the number of transmission times of each block in the signal unit is reduced. In FIG. 15, if the distance is 3 m or less, then the number of transmission times of each block in the signal unit is set to once.

In a case where the distance is long, the number of transmission times of each block in the signal unit is increased. In FIG. 15, the number of transmission times of each block in the signal unit is increased once by once at a distance in the range of 3 m or more to 2 m.

Note that this range may be changed as appropriate.

[3-5. Decision Method of Transmission Order of Blocks]

Figure 16:
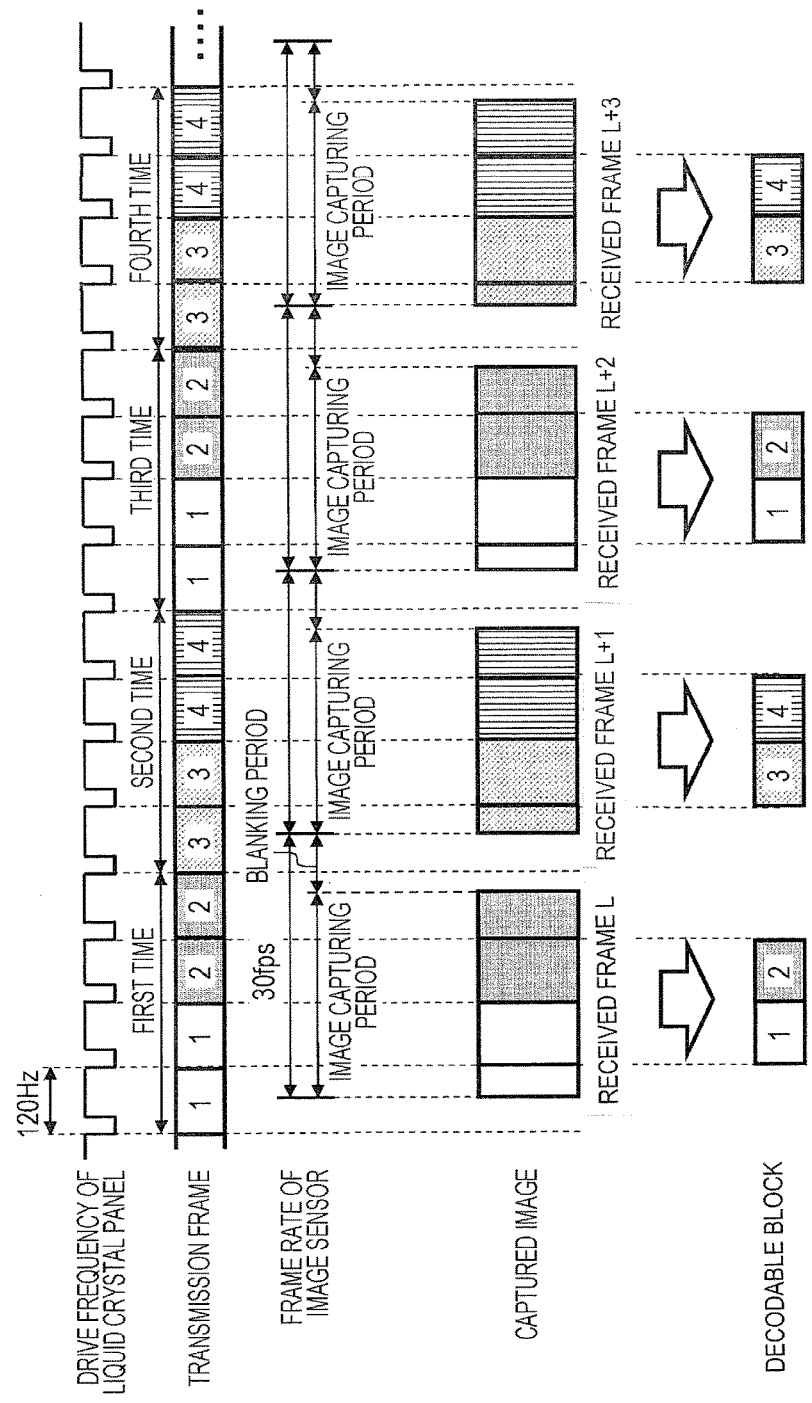
FIG. 16 is a diagram illustrating a generation example of the transmission frame corresponding to one signal unit output from the display device according to the third exemplary embodiment.

Next, a description will be given of a decision method of the transmission order of the blocks corresponding to one signal unit. FIG. 16 is a diagram illustrating a generation example of the transmission frame corresponding to one signal unit output from display device 100 according to the third exemplary embodiment. FIG. 16 shows a case where the distance is 3 m. The drive frequency of the liquid crystal panel, which is display panel 150 of display device 100 in this exemplary embodiment, is 120 Hz, and the image sensor of image capturing unit 210 of receiver 200 operates at a frame rate of 30 fps. Moreover, the transmission frame of display device 100 is output in synchronization with the drive frequency of the liquid crystal panel. FIG. 16 shows a case where one signal unit of the visible light communication signal output from display device 100 is output four times by the Carousel method. It is assumed that one signal unit includes four data items with a same data length, and is encoded to generate four blocks.

In FIG. 15, in the case where the distance is 3 m, the number of transmission times of the arbitrary blocks in one transmission frame of the signal unit is twice. Hence, as shown in FIG. 16, for one transmission frame, the arbitrary blocks are transmitted twice by twice.

The order of the blocks of the first transmission frame output from display device 100 is block 1, block 1, block 2, and block 2 so that each of block 1 and block 2 can be output twice. For the first transmission frame output from display device 100, receiver 200 performs the exposure of the image sensor during the image capturing period at one frame rate. Receiver 200 generates received frame L, which is the captured image, based on the exposure data items. Receiver 200 decodes the visible light communication signal from received frame L. Block 1 and block 2, in which all of the data items are included in received frame L, can be decoded as the visible light communication signal.

The order of the blocks of the second transmission frame output from display device 100 is block 3, block 3, block 4, and block 4 so that each of block 3 and block 4 can be output twice. For the second transmission frame output from display device 100, receiver 200 performs the exposure of the image sensor during the image capturing period at one frame rate. Receiver 200 generates received frame L+1, which is the captured image, based on the exposure data items. Receiver 200 decodes the visible light communication signal from received frame L+1. Block 3 and block 4, in which all of the data items are included in received frame L+1, can be decoded as the visible light communication signal.

The order of the blocks of the third transmission frame output from display device 100 is block 1, block 1, block 2, and block 2 so that each of block 1 and block 2 can be output twice. For the third transmission frame output from display device 100, receiver 200 performs the exposure of the image sensor during the image capturing period at one frame rate. Receiver 200 generates received frame L+2, which is the captured image, based on the exposure data items. Receiver 200 decodes the visible light communication signal from received frame L+2. Block 1 and block 2, in which all of the data items are included in received frame L+2, can be decoded as the visible light communication signal.

The order of the blocks of the fourth transmission frame output from display device 100 is block 3, block 3, block 4 and block 4 so that each of block 3 and block 4 can be output twice. For the fourth transmission frame output from display device 100, receiver 200 performs the exposure of the image sensor during the image capturing period at one frame rate. Receiver 200 generates received frame L+3, which is the captured image, based on the exposure data items. Receiver 200 decodes the visible light communication signal from received frame L+3. Block 3 and block 4, in which all of the data items are included in received frame L+3, can be decoded as the visible light communication signal.

As described above, each of the received frames can receive one block among the arbitrary blocks, which are included in the transmission frame and are output twice. That is, two different blocks can be received from each of the received frames.

Figure 17:
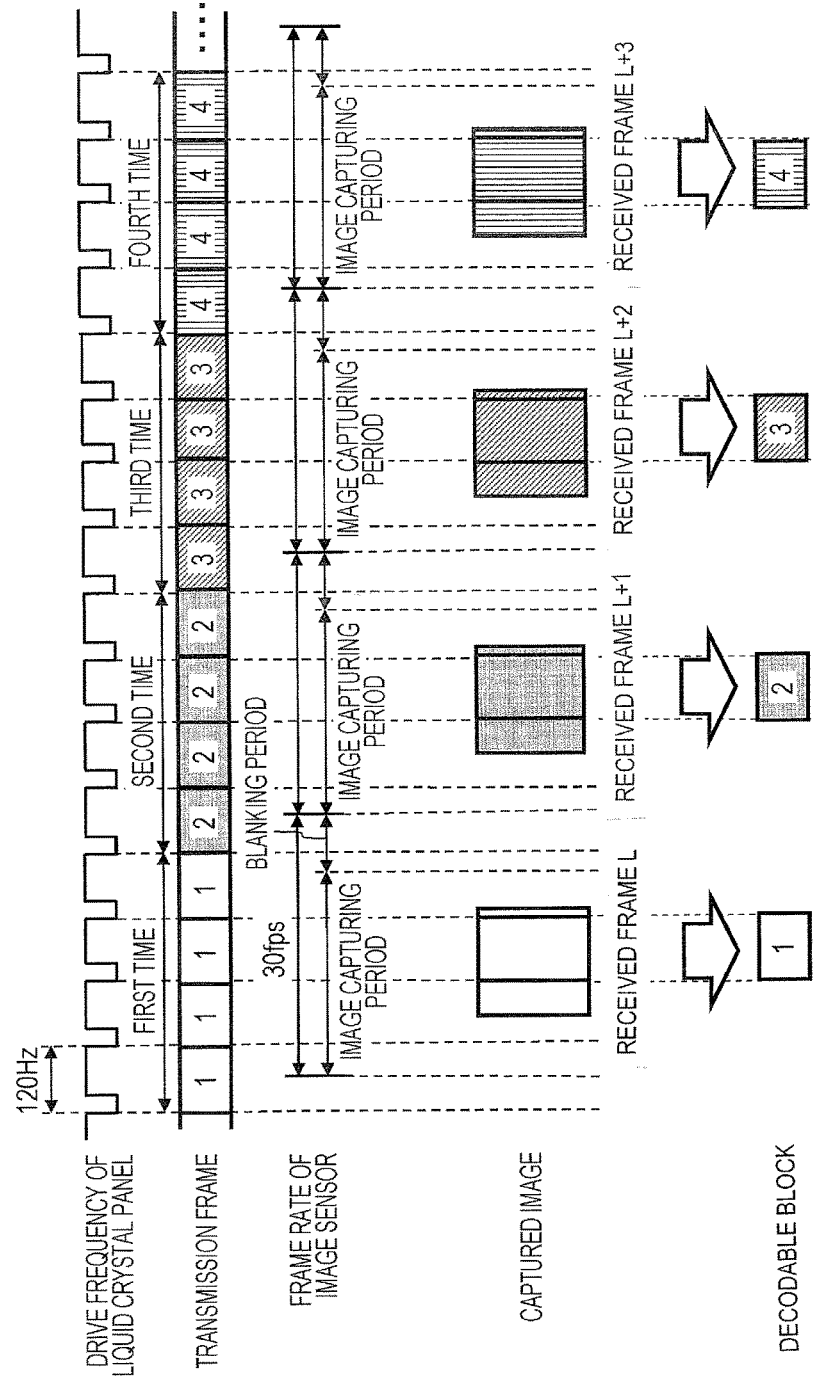
FIG. 17 is a diagram illustrating another generation example of the transmission frame corresponding to one signal unit output from the display device according to the third exemplary embodiment.

FIG. 17 is a diagram illustrating another generation example of the transmission frame corresponding to one signal unit output from the display device according to the third exemplary embodiment. FIG. 17 shows a case where the distance is 8 m. The drive frequency of the liquid crystal panel, which is display panel 150 of display device 100 in this exemplary embodiment, is 120 Hz, and the image sensor of image capturing unit 210 of receiver 200 operates at a frame rate of 30 fps. Moreover, the transmission frame of display device 100 is output in synchronization with the drive frequency of the liquid crystal panel. FIG. 17 shows a case where one signal unit of the visible light communication signal output from display device 100 is output four times by the Carousel method. It is assumed that one signal unit includes four data items with a same data length, and is encoded to generate four blocks.

In FIG. 15, in the case where the distance is 8 m, the number of transmission times of the arbitrary blocks in one transmission frame of the signal unit is four times Hence, as shown in FIG. 17, for one transmission frame, the arbitrary blocks are transmitted four times by four times.

As the order of the blocks of the first transmission frame output from display device 100, block 1 is output four times. For the first transmission frame output from display device 100, receiver 200 performs the exposure of the image sensor during the image capturing period at one frame rate. Receiver 200 generates received frame L, which is the captured image, based on the exposure data items. Receiver 200 decodes the visible light communication signal from received frame L. Block 1, in which all of the data items are included in received frame L, can be decoded as the visible light communication signal.

As the order of the blocks of the second transmission frame output from display device 100, block 2 is output four times. For the second transmission frame output from display device 100, receiver 200 performs the exposure of the image sensor during the image capturing period at one frame rate. Receiver 200 generates received frame L+1, which is the captured image, based on the exposure data items. Receiver 200 decodes the visible light communication signal from received frame L+1. Block 2, in which all of the data items are included in received frame L+1, can be decoded as the visible light communication signal.

As the order of the blocks of the third transmission frame output from display device 100, block 3 is output four times. For the third transmission frame output from display device 100, receiver 200 performs the exposure of the image sensor during the image capturing period at one frame rate. Receiver 200 generates received frame L+2, which is the captured image, based on the exposure data items. Receiver 200 decodes the visible light communication signal from received frame L+2. Block 3, in which all of the data items are included in received frame L+2, can be decoded as the visible light communication signal.

As the order of the blocks of the fourth transmission frame output from display device 100, block 4 is output four times. For the fourth transmission frame output from display device 100, receiver 200 performs the exposure of the image sensor during the image capturing period at one frame rate. Receiver 200 generates received frame L+3, which is the captured image, based on the exposure data items. Receiver 200 decodes the visible light communication signal from received frame L+3. Block 4, in which all of the data items are included in received frame L+3, can be decoded as the visible light communication signal.

As described above, each of the received frames can receive one block among the arbitrary blocks, which are included in the transmission frame and are output four times. That is, one block can be received from each of the received frames.

[3-6. Effect and the Like]

As described above, in this exemplary embodiment, in response to the distance between the display device and the receiver capable of receiving the output visible light communication signal, the visible light communication processor decides the number of same blocks to be included in the transmission frames, and generates the plurality of transmission frames corresponding to the signal units.

In such a way, display device 100 changes the number of transmission times of the blocks in response to the distance between display device 100 and receiver 200, and outputs the plurality of transmission frames, whereby receiver 200 can decode the visible light communication signal.

Display device 100 of this exemplary embodiment is particularly effective in the case where the relationship between the drive frequency of the liquid crystal panel and the frame rate of the image sensor is a relationship of mutually integer multiples or integer divisions, and in the case where the transmission frame is output from display device 100 in synchronization with the drive frequency of the liquid crystal panel.

Note that the distance between display device 100 and receiver 200 can be preset by display device 100, and further, desirably, is changed as appropriate according to a purpose and an installation situation of display device 100.

For designation of the distance, receiver 200 may make a setting request to display device 100 through a wireless communication such as Wireless Fidelity (Wi-Fi), Bluetooth (registered trademark), and Long Term Evolution (LTE).

Moreover, the distance may be estimated by using a sensor or a camera in either one of display device 100 and receiver 200.

Moreover, in this exemplary embodiment, the generated transmission frame is an example, and the transmission frame is not limited to this.

Moreover, in this exemplary embodiment, in the case where two blocks are output a plurality of times for the transmission frame, the number of output times is set to the same number of times; however, the number of output times does not have to be the same number of times.

Fourth Exemplary Embodiment

Figure 20:
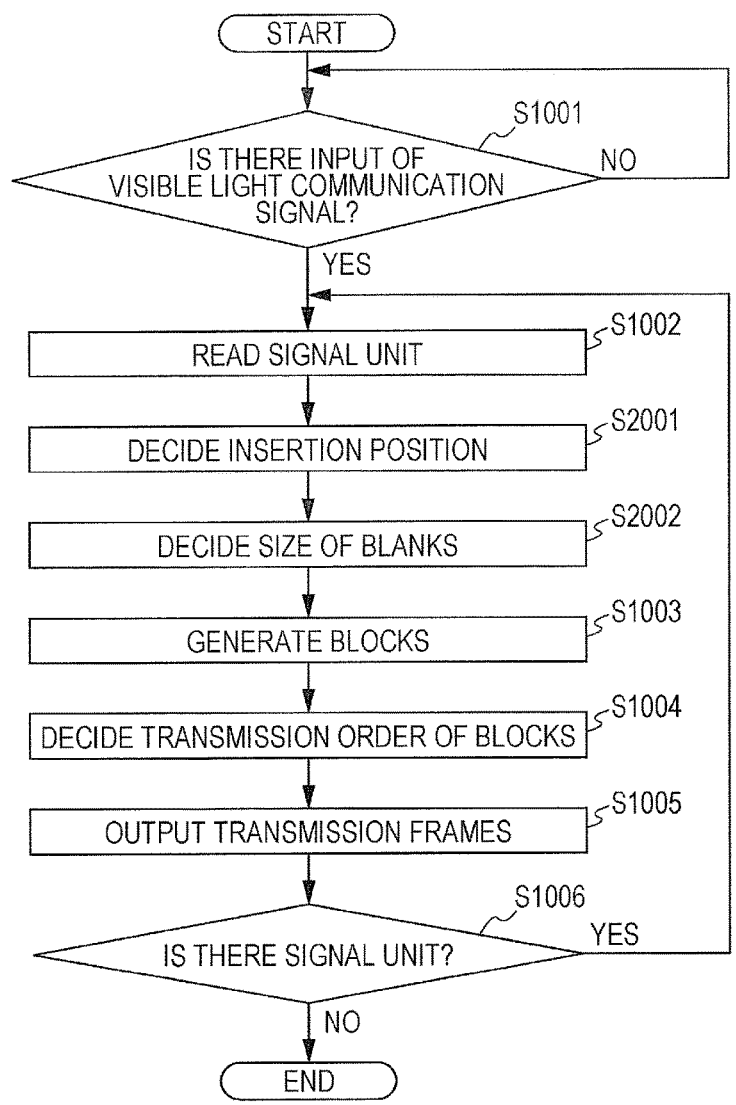
FIG. 20 is a flowchart illustrating operations of a visible light communication signal processor of a display device according to the fourth exemplary embodiment.

A description will be given below of a fourth exemplary embodiment with reference to FIG. 18 to FIG. 20.

[4-1. Configuration of Visible Light Communication System]

A visible light communication system in this exemplary embodiment has a same configuration as that of visible light communication system 10 described in the first exemplary embodiment. A description is mainly given of different points in the visible light communication system in this exemplary embodiment.

[4-2. Insertion of Blank]

Figure 18:
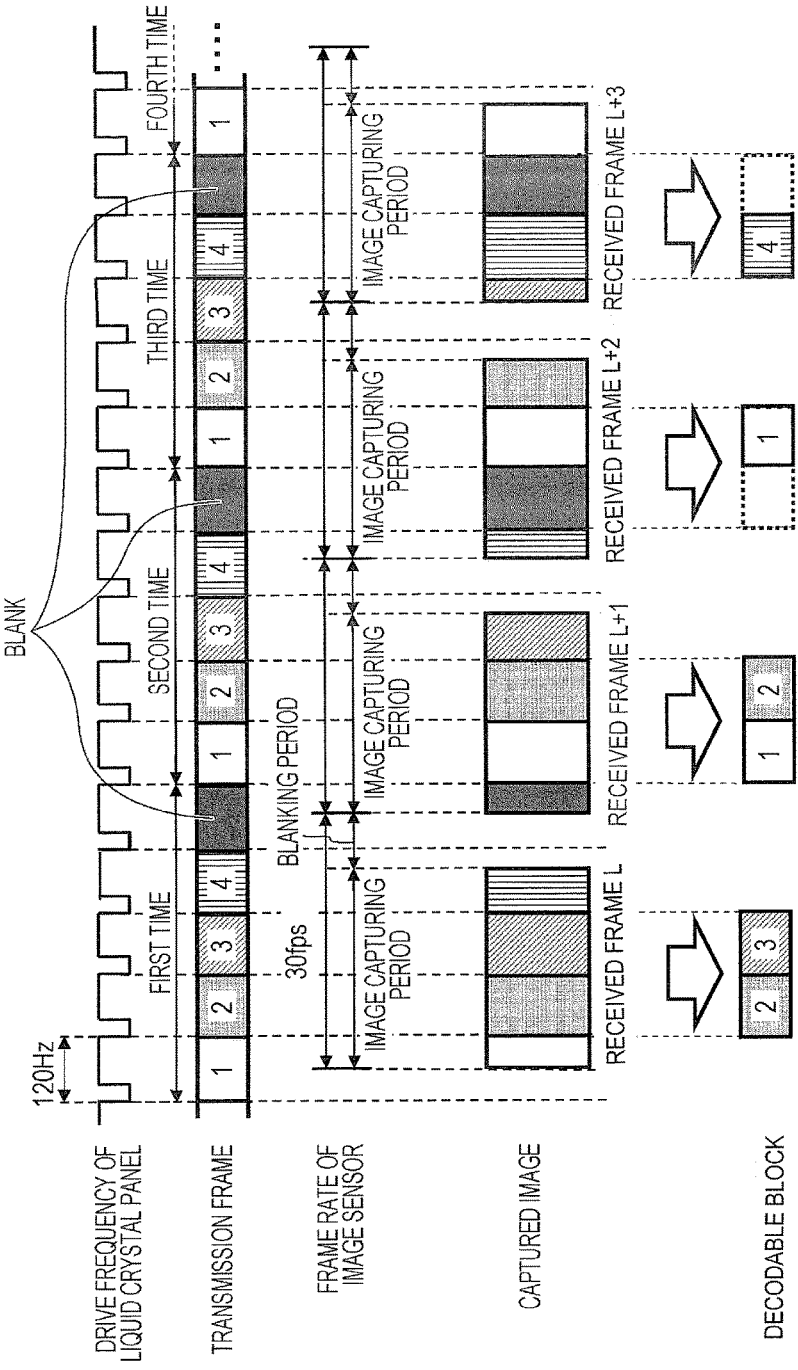
FIG. 18 is a diagram illustrating a first generation example of a transmission frame corresponding to one signal unit according to a fourth exemplary embodiment.

FIG. 18 is a diagram illustrating a generation example of the transmission frame corresponding to one signal unit according to the fourth exemplary embodiment. The drive frequency of the liquid crystal panel, which is display panel 150 of display device 100 in this exemplary embodiment, is 120 Hz, and the image sensor of image capturing unit 210 of receiver 200 operates at a frame rate of 30 fps. Moreover, the transmission frame of display device 100 is output in synchronization with the drive frequency of the liquid crystal panel. One signal unit of the visible light communication signal output from display device 100 is output four times by the Carousel method. One signal unit includes four data items with a same data length, and is encoded to generate four blocks.

In this exemplary embodiment, blanks with a same size as that of the blocks are inserted into the transmission frames so that the same block cannot be located on the same position.

In FIG. 18, in the first transmission frame output from display device 100, block 1, block 2, block 3, block 4, and the blank are arrayed in this order. For the first transmission frame output from display device 100, receiver 200 performs the exposure of the image sensor during the image capturing period at one frame rate. Receiver 200 generates received frame L, which is the captured image, based on the exposure data items. Receiver 200 decodes the visible light communication signal from received frame L. Only block 2 and block 3, in which all of the data items are included in received frame L, can be decoded as the visible light communication signal.

In the second transmission frame output from display device 100, block 1, block 2, block 3, block 4, and the blank are arrayed in this order. For a second signal unit output from display device 100, the exposure of the image sensor is performed during the image capturing period at one frame rate. Receiver 200 generates received frame L+1, which is the captured image, based on the exposure data items. Receiver 200 decodes the visible light communication signal from received frame L+1. Only block 1 and block 2, in which all of the data items are included in received frame L+1, can be decoded as the visible light communication signal.

In the third transmission frame output from display device 100, block 1, block 2, block 3, block 4, and the blank are arrayed in this order. For the third transmission frame output from display device 100, the exposure of the image sensor is performed during the image capturing period at one frame rate. Receiver 200 generates received frame L+2, which is the captured image, based on the exposure data items. Receiver 200 decodes the visible light communication signal from received frame L+2. Only block 1 in which all of the data items are included in received frame L+2, can be decoded as the visible light communication signal.

In the fourth transmission frame output from display device 100, block 1, block 2, block 3, block 4, and the blank are arrayed in this order. For the fourth transmission frame output from display device 100, the exposure of the image sensor is performed during the image capturing period at one frame rate. Receiver 200 generates received frame L+3, which is the captured image, based on the exposure data items. Receiver 200 decodes the visible light communication signal from received frame L+3. Only block 4 in which all of the data items are included in received frame L+3, can be decoded as the visible light communication signal.

Note that a signal pattern of the inserted blank may be any as long as being a pattern different from that of the data item included in the signal unit.

As described above, in the case where the relationship between the drive frequency of the liquid crystal panel and the frame rate of the image sensor is a relationship of mutually integer multiples or integer divisions, and in the case where the transmission frame is output from display device 100 in synchronization with the drive frequency of the liquid crystal panel, the blanks are inserted into the transmission frames corresponding to one signal unit, whereby the timing of turning on and turning off backlight 190 of display device 100 is prevented from being synchronized with the drive frequency of the liquid crystal panel. Then, even if the same transmission frame is output four times, all of block 1, block 2, block 3, and block 4 in one signal unit can be decoded as the visible light communication signal.

Moreover, the size of the inserted blanks is set the same as the size of the blocks, whereby fluctuations of the brightness of the video signal can be prevented, and in addition, the blanks are also effective as a brightness adjustment period.

Note that, though it has been described that the size of the inserted blanks is set the same as the size of the blocks; the size of the blanks is not limited to this. The size of the inserted blanks just needs to be decided so that the timing of turning on and turning off backlight 190 of display device 100 cannot be synchronized with the drive frequency of the liquid crystal panel.

Note that the size of the inserted blanks does not always need to be the same size.

Moreover, the generation example of the transmission frames into which the blanks are inserted is not limited to this.

FIG. 19A is a diagram illustrating a second generation example of the transmission frame corresponding to one signal unit according to the fourth exemplary embodiment.

In FIG. 19A, the blanks are inserted into last positions of the transmission frames, and the transmission order of the blocks in the transmission frames is differentiated every time as described in the first exemplary embodiment. That is, an order of the blocks of the first transmission frame output from display device 100 is block 1, block 2, block 3, block 4, and the blank. In the second transmission frame output from display device 100, block 4, block 3, block 2, block 1, and the blank are arrayed in this order. In the third transmission frame output from display device 100, block 2, block 3, block 4, block 1, and the blank are arrayed in this order.

FIG. 19B is a diagram illustrating a third generation example of the transmission frame corresponding to one signal unit according to the fourth exemplary embodiment.

In FIG. 19B, the blanks are inserted after the respective blocks of the transmission frames. That is, the order of the blocks of the transmission frames output from display device 100 is block 1, the blank, block 2, the blank, block 3, the blank, block 4, and the blank. A size of the inserted blanks is a product as a block length×α (decimal fraction satisfying 0<α≤1). α is decided so that the timing of turning on and turning off backlight 190 of display device 100 cannot be synchronized with the drive frequency of the liquid crystal panel.

FIG. 19C is a diagram illustrating a fourth generation example of the transmission frame corresponding to one signal unit according to the fourth exemplary embodiment.

In FIG. 19C, the blanks are inserted after arbitrary blocks of the transmission frames. That is, the order of the blocks in the transmission frames output from display device 100 is block 1, the blank, block 2, the blank, block 3, and block 4.

[4-3. Operation of Visible Light Communication Signal Processor]

A main different point of the fourth exemplary embodiment from the first exemplary embodiment is operations of visible light communication signal processor 170. Next, a description will be given of operations of visible light communication signal processor 170. FIG. 20 is a flowchart illustrating the operations of visible light communication signal processor 170 of display device 100 according to the fourth exemplary embodiment.

Operations of Step S1001 and Step S1002 are the same as the operations of the first exemplary embodiment.

(Step S2001) Visible light communication signal processor 170 decides positions into which the blanks are inserted in the transmission unit.

(Step S2002) Visible light communication signal processor 170 decides the size of the blanks.

Operations of Step S1003 and Step S1006 are the same as the operations in the first exemplary embodiment.

[4-4. Effect and the Like]

As described above, in the display device of this exemplary embodiment, the visible light communication processor inserts the blank into at least one transmission frame among the plurality of transmission frames corresponding to one signal unit.

In such a way, the blank is inserted into the transmission frame corresponding to one signal unit, whereby the timing of turning on and turning off backlight 190 of display device 100 is prevented from being synchronized with the drive frequency of the liquid crystal panel, and receiver 200 can decode the visible light communication signal.

Display device 100 of this exemplary embodiment is particularly effective in the case where the relationship between the drive frequency of the liquid crystal panel and the frame rate of the image sensor is a relationship of mutually integer multiples or integer divisions, and in the case where the transmission frame is output from display device 100 in synchronization with the drive frequency of the liquid crystal panel.

Another Exemplary Embodiment

As above, the first to fourth exemplary embodiments are described as the exemplifications of the technology of the present disclosure. The technology of the present disclosure is not limited to this, and is also applicable to exemplary embodiments subjected to alteration, substitution, addition, omission and the like. Moreover, it is also possible to constitute new exemplary embodiments by combining the respective constituent elements, which are described in the foregoing first to fourth exemplary embodiments, with one another.

Note that, in the display device of the present disclosure, there is shown the generation examples of the transmission frames in the case where the transmission frames are output in synchronization with the drive frequency of the liquid crystal panel; however, the generation of the transmission frames is not limited to this.

For example, even in a case where the transmission frames are output from the display device without being synchronized with the drive frequency of the liquid crystal panel, this exemplary embodiment is effective in a case where the carrier frequency at which the transmission frames are output is an integer multiple of the frequency of the image sensor.

Moreover, the description will be given of the case where the display panel of the display device is the liquid crystal panel, the display panel is not limited to this.

For example, even if the display device is a billboard in which an illumination device such as an LED illuminates an image film from a back surface of the image film, this exemplary embodiment is effective in the case where the carrier frequency of the transmission frames output from the display device becomes an integer multiple of the frequency of the image sensor of the receiver.

The display device according to the present disclosure is applicable to a display device capable of outputting the visible light communication signal, for example, a home instrument such as a television set, a personal computer, and a tablet terminal, and a field instrument such as a signage terminal, an information terminal, and an information display instrument.

What is claimed is:

1. A display device configured to output, by a Carousel method, a visible light communication signal including a plurality of signal units, the display device comprising:
   a display panel configured to display a video signal;
   a visible light communication processor configured to encode the signal units, divide each of the encoded signal units into a plurality of blocks, generate a plurality of transmission frames by using the plurality of blocks, and use the generated transmission frames as a backlight control signal; and
   a backlight configured to illuminate the display panel from a back surface of the display panel based on the backlight control signal, wherein
   in the plurality of transmission frames generated by the visible light communication processor and corresponding to one of the signal units, an order of blocks is different in at least two of the transmission frames,
   the plurality of transmission frames generated by the visible light communication processor and corresponding to the one signal unit include:
      an identical block in at least two transmission frames that are adjacent in time, and
      a plurality of identical blocks in at least one of the transmission frames, and
   the plurality of transmission frames corresponding to the one signal unit include all of the plurality of blocks.

2. The display device according to claim 1,
   wherein the visible light communication processor detects a region of the display panel, the region having predetermined brightness or more, and in response to a size of the region, decides a number of the identical blocks to be included in the at least one of the transmission frames, and generates the plurality of transmission frames corresponding to the one signal unit.

3. The display device according to claim 1, wherein, in response to a distance between the display panel and a receiver configured to receive the output visible light communication signal, the visible light communication processor decides a number of the identical blocks to be included in the at least one of the transmission frames, and generates the plurality of transmission frames corresponding to the one signal unit.

4. The display device according to claim 1, wherein the visible light communication signal processor inserts a reset signal between two adjacent signal units among the signal units.

5. The display device according to claim 1, wherein the visible light communication processor inserts a blank into at least one transmission frame among the plurality of transmission frames corresponding to the one signal unit.

6. The display device according to claim 1, wherein
   the plurality of transmission frames generated by the visible light communication processor and corresponding to the one signal unit include a plurality of first identical blocks in a first transmission frame and a plurality of second identical blocks in a second transmission frame, the first identical blocks being different from the second identical blocks.

7. A display method configured to output, by a Carousel method, a visible light communication signal including a plurality of signal units, the display method comprising:
   a first step of encoding the signal units, dividing each of the encoded signal units into a plurality of blocks, generating a plurality of transmission frames by using the plurality of blocks, the transmission frames being output by the Carousel method, and outputting the generated transmission frames as a backlight control signal; and
   a second step of controlling a backlight based on the backlight control signal, wherein
   in the plurality of transmission frames generated in the first step and corresponding to one of the signal units, an order of blocks is different in at least two of the transmission frames,
   the plurality of transmission frames generated in the first step and corresponding to the one signal unit include:
      an identical block in at least two transmission frames that are adjacent in time, and
      a plurality of identical blocks in at least one of the transmission frames, and
   the plurality of transmission frames corresponding to the one signal unit include all of the plurality of blocks.

* * * * *